（12）United States Patent
Paek et al.

(10) Patent No.: US 10,541,544 B2
(45) Date of Patent: *Jan. 21, 2020

(54) MULTIPLE CURRENT SOURCE PRIORITIZATION CIRCUIT WITH OVERVOLTAGE PROTECTION

(71) Applicant: Miasole Hi-Tech Corp., Santa Clara, CA (US)

(72) Inventors: Hyung Paek, Burlingame, CA (US); Jia-Jay Bill Liu, Pleasanton, CA (US); Thomas Aquinas Heckel, Mountain View, CA (US); Nicholai Busch, Mountain View, CA (US); Uriel Rosas Rivera, San Jose, CA (US); James Teixeira, San Jose, CA (US); Nicolas Guerrero, San Francisco, CA (US); Jason Stephen Corneille, Boulder Creek, CA (US); Richard Weinberg, Cupertino, CA (US)

(73) Assignee: MIASOLÉ HI-TECH CORP., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,226

(22) Filed: May 14, 2019

(65) Prior Publication Data

US 2019/0267819 A1 Aug. 29, 2019

Related U.S. Application Data

(63) Continuation-in-part of application No. 15/789,187, filed on Oct. 20, 2017, now Pat. No. 10,389,298.

(Continued)

(51) Int. Cl.
*H02J 7/00* (2006.01)
*H02J 7/35* (2006.01)
(Continued)

(52) U.S. Cl.
CPC ............ *H02J 7/0029* (2013.01); *H02J 7/007* (2013.01); *H02J 7/0063* (2013.01); *H02J 7/14* (2013.01);
(Continued)

(58) Field of Classification Search
CPC .............. H02S 40/38; H02J 2007/0039; H02J 2007/0037
See application file for complete search history.

(56) References Cited

U.S. PATENT DOCUMENTS 6,204,645 B1 3/2001 Cullen
6,784,635 B2 8/2004 Larson
(Continued)

FOREIGN PATENT DOCUMENTS

CN 101826641 9/2010
CN 203166595 8/2013
(Continued)

OTHER PUBLICATIONS

U.S. Notice of Allowance dated Apr. 5, 2019 issued in U.S. Appl. No. 15/789,187.

*Primary Examiner* — Naum Levin
(74) *Attorney, Agent, or Firm* — Weaver Austin Villeneuve & Sampson, LLP

(57) ABSTRACT

Techniques and systems are described that enable multiple current source prioritization with overvoltage protection.

20 Claims, 8 Drawing Sheets

US 10,541,544 B2
Page 2

Related U.S. Application Data

(60) Provisional application No. 62/556,166, filed on Sep. 8, 2017.

(51) Int. Cl.
  *H02S 40/38* (2014.01)
  *H02J 7/14* (2006.01)

(52) U.S. Cl.
  CPC ............... *H02J 7/35* (2013.01); *H02S 40/38* (2014.12); *H02J 2007/0037* (2013.01)

(56) References Cited

U.S. PATENT DOCUMENTS

| | | |
|---|---|---|
| 7,276,815 B2 | 10/2007 | Algrain et al. |
| 8,004,242 B1 | 8/2011 | Purkey et al. |
| 8,853,993 B2 | 10/2014 | Wu et al. |
| 9,090,253 B2 | 7/2015 | Flath et al. |
| 9,120,364 B2 | 9/2015 | Reichart et al. |
| 9,156,359 B2 | 10/2015 | Atluri et al. |
| 9,163,600 B2 | 10/2015 | Neet |
| 9,682,629 B2 | 6/2017 | Saint-Leger et al. |
| 9,878,682 B2 | 1/2018 | Pierce et al. |
| 9,948,136 B2 | 4/2018 | Doane et al. |
| 10,053,035 B1 | 8/2018 | Dixon et al. |
| 10,065,521 B2 | 9/2018 | Henningson et al. |
| 10,124,794 B2 | 11/2018 | Akuzawa |
| 2007/0023078 A1 | 2/2007 | Palladino |
| 2009/0079385 A1 | 3/2009 | Xiao et al. |
| 2010/0320959 A1* | 12/2010 | Tomberlin ............ B62D 31/003 320/101 |
| 2012/0173031 A1 | 7/2012 | Parameswaran et al. |
| 2013/0144504 A1 | 6/2013 | D'Ambrosio et al. |
| 2014/0095018 A1 | 4/2014 | Atluri et al. |
| 2014/0361611 A1 | 12/2014 | Saint-Leger et al. |
| 2015/0353036 A1 | 12/2015 | Pierce et al. |
| 2016/0276850 A1 | 9/2016 | Shelton |
| 2016/0380473 A1 | 12/2016 | Henningson et al. |
| 2017/0217280 A1 | 8/2017 | Larson et al. |
| 2018/0009431 A1 | 1/2018 | Akuzawa |
| 2019/0081593 A1 | 3/2019 | Paek et al. |

FOREIGN PATENT DOCUMENTS

| | | |
|---|---|---|
| DE | 102008035453 | 4/2009 |
| EP | 1465315 | 4/2003 |
| JP | S5770748 | 5/1982 |
| JP | 2006327247 | 12/2006 |
| JP | 2007022211 A | 2/2007 |

* cited by examiner

MULTIPLE CURRENT SOURCE PRIORITIZATION CIRCUIT WITH OVERVOLTAGE PROTECTION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

In a vehicle, the alternator is a source of DC current for providing power to vehicle electronics and to charge onboard batteries. However, the alternator represents a mechanical load on the internal combustion engine and therefore impacts fuel economy. Vehicle operators are deploying systems that augment the alternator with additional current sources, such as solar.

Concurrently using multiple current sources, such as a solar panel and an alternator, when charging a vehicle battery can produce inconsistent results in terms of power delivery and final battery voltage if not properly controlled. If the battery voltage is not properly managed, the battery can be overcharged or undercharged, resulting in reduced battery life and capacity.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a multiple current source prioritization circuit that prevents a battery from charging to a voltage above a first voltage setpoint for a first voltage regulator, including: a first input configured to interface to an alternator coupled to the first voltage regulator. The multiple current source prioritization circuit also includes a second input configured to interface to a solar panel, the second input having a current regulator. The multiple current source prioritization circuit also includes a first output configured to interface to the battery having a charge/discharge current and to a load having a load current. The multiple current source prioritization circuit also includes first circuitry configured to detect that the alternator is in a first state, the first state corresponding to the first voltage setpoint for the first voltage regulator; and second circuitry configured to: when the first circuitry represents that the alternator is in the first state, set the current regulator to a first constant current value below the load current, where: a first current at the first output includes an amount of current from the solar panel corresponding to at least the first constant current value. Other embodiments of this aspect include corresponding computer systems, apparatus, and computer programs recorded on one or more computer storage devices, each configured to perform the actions of the methods.

Implementations may include one or more of the following features. The multiple current source prioritization circuit where the second input further includes a second voltage regulator, and further where the second input includes a switch for selectively coupling the second voltage regulator or the current regulator to the solar panel. The multiple current source prioritization circuit where the second input further includes a second voltage regulator, and further where each of the second voltage regulator and current regulator can be separately enabled/disabled. The multiple current source prioritization circuit where the second input further includes a second voltage regulator, and further where a charge controller is configurable to a first mode to operate as the current regulator, and the charge controller is configurable to a second mode to operate as the second voltage regulator. The multiple current source prioritization circuit where the second circuitry is further configured to: when the first circuitry represents that the alternator is not in the first state: configure the charge controller to operate in the second mode using boost/bulk/float battery charging voltage regulation. The multiple current source prioritization circuit where the charge controller is configured to the first mode to operate as the current regulator by overriding a control loop for the second voltage regulator. The multiple current source prioritization circuit where overriding the control loop for the second voltage regulator includes providing an indication of a voltage setpoint for the second voltage regulator that overrides proportional-integral-derivative (PID) functions of the second voltage regulator. The multiple current source prioritization circuit where the first state corresponds to an amount of current from the alternator that is greater than about 0.5 amperes, or a voltage presence between about 10 V to about 60 V for longer than about five seconds. The multiple current source prioritization circuit further including: third circuitry configured to monitor an increased current generated by the alternator, the increased current generated by the alternator corresponding to an increased load current; where the second circuitry is further configured to: set the current regulator to a second constant current value below the increased load current, where: a second current at the first output includes an amount of current from the solar panel corresponding to at least the second constant current value. Implementations of the described techniques may include hardware, a method or process, or computer software on a computer-accessible medium.

One general aspect includes a method of operating a multiple current source prioritization circuit that prevents battery overcharging, the method including: detecting, by first circuitry, the output of an alternator interfaced through a first input. The method of operating also includes providing, by the first circuitry, the detected output of the alternator to second circuitry. The method of operating also includes determining, by the second circuitry, that the alternator is in a first state, the first state corresponding to a first voltage setpoint for a first voltage regulator for the alternator; configuring, by the second circuitry, in response to determining that the alternator is in the first state, a current regulator to a first constant current value below a load current, where: the load current is interfaced through a first output, the first output being interfaced to a battery having a charge/discharge current and to a load having the load current, and where the current regulator is interfaced through a second input to a solar panel; and further where: a first current at the first output includes an amount of current from the solar panel corresponding to at least the first constant current value. Other embodiments of this aspect include corresponding computer systems, apparatus, and computer programs recorded on one or more computer storage devices, each configured to perform the actions of the methods.

Implementations may include one or more of the following features. The method where the second circuitry further includes a second voltage regulator, and further where a charge controller is configurable to a first mode to operate as the current regulator, and the charge controller is configurable to a second mode to operate as the second voltage regulator. The method where the second circuitry is further configured to: when the first circuitry represents that the alternator is not in the first state: configure the charge controller to operate in the second mode using boost/bulk/float battery charging voltage regulation. The method where the charge controller is configured to the first mode to operate as the current regulator by overriding a control loop for the second voltage regulator. The method where overriding the control loop for the second voltage regulator includes providing an indication of a voltage setpoint for the second voltage regulator that overrides proportional-integral-derivative (PID) functions of the second voltage regulator. The method where the first state corresponds to an amount of current from the alternator that is greater than about 0.5 amperes, or a voltage presence between about 10 V to about 60 V for longer than about five seconds. The method further including: monitoring, using third circuitry, an increased current generated by the alternator, the increased current generated by the alternator corresponding to an increased load current; set, by the second circuitry, in response to the third circuitry indicating an increased load current, the current regulator to a second constant current value below the increased load current, where: a second current at the first output includes an amount of current from the solar panel corresponding to at least the second constant current value. Implementations of the described techniques may include hardware, a method or process, or computer software on a computer-accessible medium.

One general aspect includes a circuit, including: a first input configured to interface to a first power source. The circuit also includes a second input configured to interface to a second power source. The circuit also includes a first output configured to interface to a battery having a charge/discharge current and to a load having a load current. The circuit also includes first circuitry configured to detect that the first power source is in a first state, the first state corresponding to the first power source being regulated by a first voltage setpoint for a first voltage regulator coupled to the first power source, the first voltage setpoint being below overvoltage conditions for the battery; and second circuitry configured to: when the first circuitry represents that the first power source is in the first state; generate a first constant current value below the load current, where: a first current at the first output includes an amount of current from the second power source corresponding to at least the first constant current value. Other embodiments of this aspect include corresponding computer systems, apparatus, and computer programs recorded on one or more computer storage devices, each configured to perform the actions of the methods.

Implementations may include one or more of the following features. The circuit where the second circuitry is further configured to: when the first circuitry represents that the first power source is not in the first state: generate voltages using boost/bulk/float battery charging voltage regulation. The circuit where the second circuitry further includes a charge controller selectively configurable to: a first mode to generate current at the first constant current value, and to a second mode to generate voltages at the boost/bulk/float voltages. The circuit where the charge controller is configured to the first mode to operate as a current regulator by overriding a control loop for voltage regulation. Implementations of the described techniques may include hardware, a method or process, or computer software on a computer-accessible medium.

These and other aspects are described further below with reference to the drawings.

DETAILED DESCRIPTION

Figures 1A, 1B, 1C, 1D:
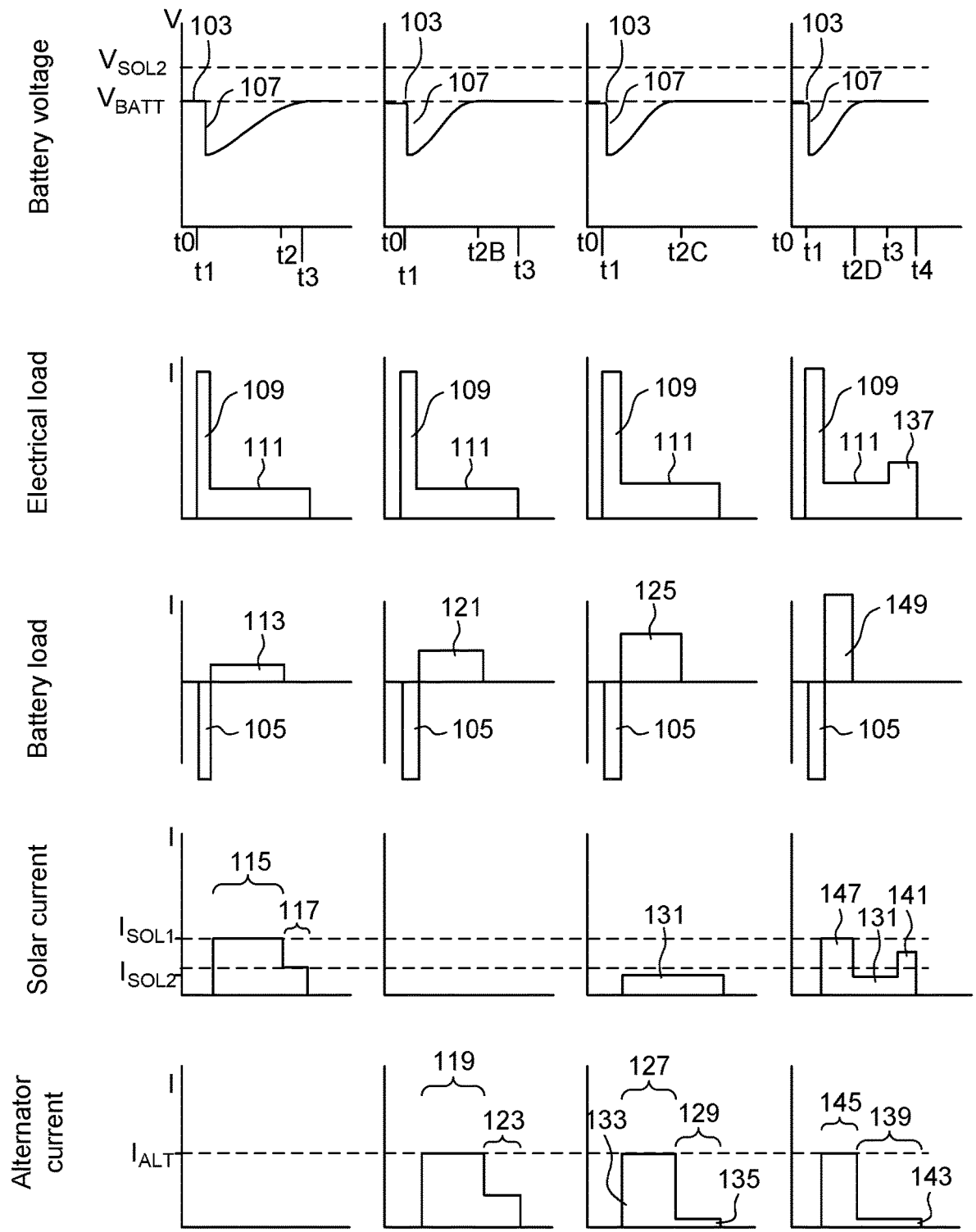
FIGS. 1A-1D are illustrations of example operational scenarios for a multiple current source prioritization circuit with overvoltage protection.

This disclosure describes systems and techniques for prioritizing the current output of concurrently operating current sources. For example, when a solar panel and an alternator are both outputting current to the same battery load and electrical load, the current draw from a solar panel can be maximized while the current draw from an alternator can be minimized. Further disclosed are systems and techniques for continuous battery overvoltage protection. For example, a solar panel can be configured to have different voltage and current profiles based on whether an alternator is on or off.

In a system with two or more charging sources, the output current of each source can be determined to create the most efficient system. The voltage setpoint of each source can then be used to determine the sequence that each source will stop to contribute.

For example, when only one source is providing current, if the output current of the one source is limited to an amount less than an electrical load current, a battery voltage will drop since there is net current leaving the battery. Therefore, a particular voltage setpoint for a voltage regulator for the one source set at any value that is both supported by the voltage regulator and higher than the existing battery voltage will not be reached.

As a further example, when two sources are providing a combined current slightly greater than the electrical load current, the battery can be charged, and either the first or second source can be configured to regulate the final battery charge voltage. For example, configuring the voltage regulator for the second source to have a lower voltage setpoint than the voltage setpoint for the voltage regulator for the first source, and configuring the first source to have a current limit lower than the electrical load current, the lower voltage setpoint regulates the final battery charge voltage. This is because once the lower voltage setpoint is reached, the portion of the combined current from the second source decreases, and the remaining current, corresponding to current from the first source, is limited to being below the electrical load current. As a result, the battery no longer has a net charge current and the battery voltage does not continue rising.

In contrast, without configuring the first source to have a current limit lower than the electrical load current, the battery voltage can continue to rise and a higher voltage setpoint for the voltage regulator for the first source can regulate the final battery charge voltage. If the higher voltage setpoint exceeds the rated voltage for the battery, the overvoltage condition may damage the battery life/capacity.

As described herein, limiting the current of one source to below an electrical load current allows the one source to maximize its current contribution while allowing another source to regulate a battery voltage. In some implementations, current sensing enables one source to operate with a particular output voltage setpoint and particular current limit to maximize current contribution while allowing another source to regulate a battery voltage. In certain implementations, using one or more digital signal outputs from a current sensor monitoring one source simplifies source control circuitry and/or firmware for a second source. In various implementations, using a passive device (e.g., diodes, etc.) or an active device (e.g., linear regulators, etc.) simplifies the design of the source. In some implementations the current prioritization circuit can be installed without altering the OEM vehicle hardware and can operate without communicating with the vehicle's system.

FIGS. 1A-1D illustrate an example of current source prioritization circuitry operating in different scenarios. The scenarios correspond to an example implementation of a vehicle having a battery that can serve as an energy source for electrical systems on the vehicle. The vehicle has at least two current sources that can act as chargers for the battery, and at least one electrical load connected to the battery. In FIGS. 1A-1D, a solar charge controller acts as the primary source, and an alternator as the secondary source.

Each current source can have a voltage regulator. The voltage regulator may have an internal voltage reference, which can be used when making comparisons between a configured voltage setpoint for the voltage regulator and a voltage detected at the output of the voltage regulator. The voltage regulator can adjust the detected voltage at the output of the voltage regulator, for example, by increasing the current. Increasing the current flowing through a resistive load causes the output of the voltage regulator to increase towards the voltage setpoint. Similarly, increasing the current such that there is a net flow of current into a battery causes the voltage across the battery terminals to increase, and thereby the voltage output of the voltage regulator converges towards the voltage setpoint. The voltage regulator can be implemented using a wide variety of circuit designs that maintain a voltage level. The voltage regulator may use a feed-forward or negative feedback design, and may use electromechanical mechanisms and/or electrical components. The voltage regulator may regulate AC or DC voltages. In some implementations, a current source may have no voltage regulator, and instead, the current source is configured, such as based on the solar panel array design, to not exceed a particular voltage.

A current source may have a current limiter. The current limiter can be implemented using a wide variety of circuit designs that limit a current. As one nonlimiting example, a current limiter can be implemented using a low-value sense resistor, a control circuit, and a pass transistor. As another nonlimiting example, the current limiter can use a P-channel MOSFET as a pass device with a gate voltage controlled by a transistor that amplifies the voltage drop across a sense resistor. It should be appreciated that current limiter circuit designs have associated voltage drops, and in some implementations, the current limiter voltage drops can be compensated for relative to the particular voltage values described herein. In some implementations, a current source may have no current limiter, and instead, the current source is configured, such as based on the solar panel array design, to not exceed a particular current.

The electrical load connected to the battery can correspond to vehicle functions relating to, as nonlimiting examples, engine management, multimedia and heating, ventilation, and air conditioning (HVAC), body electronics, chassis electrification, lighting (exterior and interior), comfort stations, other batteries, industrial or commercial applications such as refrigeration and lift gate subsystems, and so forth. The electrical load connected to the battery draws an electrical load current. The electrical load current can be provided by sources such as the alternator or solar panel or both. When the sources are unable to provide enough current, such as because the alternator is off when igniting the engine, the battery, if sufficiently charged, can output a battery discharge current to provide the electrical load current or a portion of the electrical load current, which in turn will cause the battery voltage to decrease.

It should be appreciated that the battery can act as a battery load on the sources. When the battery is being charged, the battery can draw a battery load current, which acts as a battery charge current, and the source outputs sufficient current to provide both the electrical load current to the electrical load and the battery load to the battery. It should further be appreciated that the battery load is an electrical load on the sources, but for the description herein, the terms electrical load current and battery load current are used to clarify between current provided to an electrical load coupled to the output of a battery, and current provided to charge the battery load coupled to the output of the source(s), respectively.

FIGS. 1A-1D depict illustrated voltage and current traces for battery voltage, electrical load current, battery load current, solar current, and alternator current for a sequence of vehicle events.

It should be appreciated that the scale of the traces in FIGS. 1A-1D are relative and are not intended to limit the absolute values of time, voltage, and current values. Furthermore, for clarity purposes, voltage and current phenomena corresponding to ripple, jitter, interference, switching, noise, temperature coefficients, hysteresis, fluctuations in irradiance, and so forth, are not depicted. It should also be appreciated that the depicted uniform current output and step transition between charging and non-charging intervals for each current source are for clarity purposes, and the actual current-voltage relationship is determined by the characteristics of the current source. It should further be appreciated that the effects of control loops, such as a microprocessor causing the alternator to have a damped or delayed response to a sudden change in electrical load current to minimize any degradation in the ride experience for vehicle occupants, are not depicted for clarity purposes. It will be understood by those skilled in the art that the scope of the disclosure is not limited by reference to the following illustrative figures. Rather, the scope of this disclosure should be determined with reference to the appended claims.

FIG. 1A corresponds to a sequence including vehicle engine ignition with a fully charged battery, turning on the radio, turning off the engine, letting the battery fully charge using only solar current, and then turning off the radio. The vehicle is parked under the sunlight and experiences a uniform irradiance for the corresponding time interval.

At t0, the fully charged battery has initial battery voltage 103 corresponding to a voltage value of VBATT. At t1, when the ignition switch is triggered, such as by turning a key, a starter solenoid can close a pair of contacts for relaying starter discharge current 105 from the battery to a starter motor in order to set the vehicle engine in motion. It should be appreciated that the negative value of the depicted battery load current trace corresponds to a flow of current out of the battery. Because the battery has provided starter discharge current 105, the battery can experience starter voltage drop 107. The starter discharge current 105 can be provided to an electrical load corresponding to the starter motor, as illustrated by the corresponding starter load current 109 having a similar amplitude and time duration. Immediately after t1, the engine is turned off, such as because the vehicle operator has decided not to commence driving. Since the starter motor has already been disengaged, the electrical load current and the battery load current decrease immediately after t1. However, the radio is turned on at t1, and the vehicle electronics continue to consume an electrical load current corresponding to radio load current 111.

Shortly after t1, the solar charge controller can determine that the alternator is off, for example, by sensing the state of a vehicle ignition switch. In some implementations, determining if an alternator is off or on can include determining if the engine is running. In addition to sensing the state of a vehicle ignition switch, examples of determining if the alternator is off include but are not limited to sensing one or more of: engine RPM; mass air flow; fuel flow, oxygen (O2) flow; oil pressure; a PWM signal from fuel injectors, electrical noise on 12/24 volt system from the ignition coil. Further examples include but are not limited to using a frequency switch or sensor with an input signal from a fuel injector, the ignition, or a tachometer, using a speed sensor, detecting a battery voltage greater than 14V (or other threshold voltage dependent on battery type), and intercepting an analog or digital signal between the alternator and Engine Control Module or (Power Train Control Module) interface.

A voltage regulator can be coupled to the solar panel, such as a voltage regulator integrated into a solar charge controller. As a nonlimiting example, the voltage regulator can be a linear shunt regulator, which varies a resistance that is parallel to the electrical load and battery load to shunt a variable amount of current towards ground. For instance, when the voltage setpoint is 14.0 and the detected voltage is 13.5 volts, the voltage regulator can maximize the shunt resistance such that the maximum amount of current from the solar panel is provided to the output of the voltage regulator. When the detected voltage is equal to or exceeds, for example 14.0 volts, the voltage regulator can lower the shunt resistance to shunt all current from the solar panel away from the battery.

Based on detecting no other current sources other than the solar panel, the solar charge controller can be configured to a voltage profile corresponding to setting a voltage setpoint VSOL1 for a voltage regulator for the solar panel to VBATT. In some implementations, VSOL1 can be a slightly lower voltage, such as VSOL1=VBATT−0.3, to provide a voltage margin.

Also based on detecting no other current sources other than the solar panel, the solar charge controller can be configured to have a current profile corresponding to ISOL1, a current limit greater than radio load current 111. The charge current 113, corresponding to ISOL1 minus radio load current 111, can be provided to the battery to raise the battery voltage during charge interval 115. At time t2, the battery voltage has reached the VSOL1 voltage setpoint. Also at t2, the voltage regulator can configure the shunt resistor to divert an amount of current corresponding to charge current 113 towards ground so as to prevent further charging of the battery. The voltage regulator still provides the radio load current 111 at the voltage regulator output to power the radio, as illustrated by the non-charging interval 117. The radio is turned off at t3, in which the electrical load current and the solar current are depicted to decrease to zero.

Therefore, FIG. 1A illustrates how the solar current source can provide current to an electrical load and charge a battery without overcharging the battery.

It should be appreciated that for clarity purposes, electrical loads that may continue to consume current, such as vehicle security systems, are not depicted. Furthermore, for clarity purposes, the battery charging contributions of either the solar panel or the alternator during the brief time period the motor was on is not depicted.

FIG. 1B corresponds to a sequence including vehicle engine ignition with a fully charged battery, keeping the engine on, turning on the radio, letting the battery fully charge using only alternator current, and then turning off the engine and the radio. The vehicle is parked underground; therefore there is no solar current.

The voltage and current traces at times t0 and t1 are interpreted similarly as for FIG. 1A. However, immediately after t1, the engine is kept running, and an alternator can be driven by the engine.

Similar to the solar panel, the alternator can also have a voltage regulator. For example, a voltage regulator can be coupled to an alternator to control the field current applied to the rotor inside the alternator based on the detected voltage at the output of the voltage regulator. For instance, when the voltage setpoint is 14.0 and the detected voltage is 13.5 volts, the voltage regulator will supply field current to the rotor, thereby powering the electromagnets to create a magnetic field. The spinning motion of the magnetic field caused by kinetic energy from, for example, an internal combustion engine or a regenerative braking assembly, induces the alternator to generate current. As the detected voltage converges towards the voltage setpoint, the alternator voltage regulator decreases the field current, such as, for example, reducing pulse width in systems using pulse width modulation (PWM), such that the alternator current output decreases. When the detected voltage exceeds, for example 14.0 volts, the voltage regulator will stop supplying the field current and the alternator will stop generating current. This reduces the amount of work done by, for example, the internal combustion engine to drive the alternator, which in turn improves fuel economy.

The alternator voltage regulator VALT can be an industry standard voltage setpoint, such as VBATT. Shortly after t1, when the radio is drawing current and the battery is drawing current because the battery was previously discharged, the alternator voltage regulator provides a field current to the rotor such that the alternator generates current IALT. Similar to ISOL1, IALT is also greater than radio load current 111 and therefore the radio can be powered and the battery can be charged during charge interval 119 to raise the battery voltage towards VALT. However, as depicted in FIG. 1B, IALT is greater than ISOL1 such that the charge current 121 is greater than charge current 113. As a result, the charge interval 119 for charging using the alternator is a shorter time duration than charge interval 115 when using the solar panel.

At time t2B in FIG. 1B, which occurs earlier than time t2 in FIG. 1A, the battery voltage has reached the VALT voltage setpoint, and the voltage regulator can configure the field current such that the alternator current decreases to a value corresponding to radio load current 111 so as to prevent further charging of the battery. This is illustrated by the non-charging interval 123. The radio and the engine are turned off at t3, in which the electrical load current and the alternator current are depicted to decrease to zero.

Therefore, FIG. 1B illustrates how the alternator current source can provide current to an electrical load and charge a battery without overcharging the battery.

FIG. 1C corresponds to a sequence including vehicle engine ignition with a fully charged battery, keeping the engine on, turning on the radio, letting the battery fully charge using both solar current and alternator current, and then turning off the engine and the radio. The vehicle is parked under the sunlight and experiences a uniform irradiance for the corresponding time interval.

For FIG. 1C, the voltage and current traces at times t0 and t1 are interpreted similarly as for FIG. 1B, and also for immediately after t1, where the engine is kept running so that an alternator can be driven by the engine. In contrast to FIG. 1B, in FIG. 1C, the solar panel also provides a current.

As depicted in FIG. 1C, the alternator voltage regulator setpoint VALT can have a value of VBATT. Shortly after t1, when the radio is drawing current and the battery is drawing current because the battery was previously discharged, the alternator generates current IALT that is greater than radio load current 111. This allows the battery to be charged by the alternator current.

Also shortly after t1, based on detecting that the alternator current exceeds a threshold, such as 0.5 Amps, the solar charge controller can be configured to a voltage profile corresponding to setting a voltage setpoint VSOL2 for the voltage regulator for the solar panel to a value greater than VBATT. In some implementations, VSOL2 can be a voltage such as VSOL2=VBATT+0.5 Volts.

By setting a voltage profile where VSOL2 is higher than VALT, the solar panel voltage regulator shunt resistance is configured to minimize the current being shunted to ground, and the full amount of solar current, up to a current limit specified by a current profile, is output by the solar panel voltage regulator. The solar current 131 output by the solar panel voltage regulator, combined with alternator current 133 having a value of IALT from the alternator voltage regulator, minus radio load current 111, corresponds to battery load current 125 that can be provided to the battery to raise the battery voltage during charge interval 127.

As depicted in FIG. 1C, battery load current 125 is greater than both charge current 113 in FIG. 1A and charge current 121 in FIG. 1B. As a result, the charge interval 127 for charging using both the alternator current and solar current is a shorter time duration than using just alternator current or just solar current. Therefore, by reducing the time duration that the alternator is generating IALT relative to FIG. 1B, fuel economy is improved.

Also based on detecting that the alternator current exceeds a threshold, the solar charge controller can concurrently be configured to have a current profile corresponding to ISOL2, a current limit less than the total electrical load current, which corresponds to radio load current 111 for the scenario depicted in FIG. 1C.

At time t2C in FIG. 1C, which occurs earlier than time t2B in FIG. 1B, the battery voltage has reached the VALT voltage setpoint, and the voltage regulator can configure the field current such that the alternator current decreases and the battery voltage stops increasing. This is illustrated by the non-charging interval 129.

At time t2C, the battery voltage has still not reached the VSOL2 voltage setpoint, which is higher than VALT. Thus, at time t2C, the solar panel voltage regulator can still configure the shunt resistor to minimize the current being shunted to ground such that the full amount of current corresponding to ISOL2 is being output by the solar panel voltage regulator in an attempt to further increase battery voltage. However, because ISOL2 is below the radio load current 111, there will not be a net charge flowing into the battery, and therefore the battery will not continue to be charged to the elevated voltage setpoint of VSOL2.

Thus, by setting a voltage profile where VSOL2 is greater than VALT, and a current profile where ISOL2 is below the electrical load current, the battery is provided overvoltage protection by having VALT control the final battery voltage, while still maximizing the current from the solar panel up to the ISOL2 limit.

In some implementations, during non-charging interval 129, the battery voltage remains stable around VALT as a small alternator current 135 provides the current corresponding to the difference between radio load current 111 and ISOL2 for sufficiently powering the radio.

Therefore, in addition to improving fuel economy because of the shortened charging time, fuel economy is also improved because part of the required radio load current 111 can be provided by the solar current at the current limited value of ISOL2.

The radio and the engine are turned off at t3, in which the electrical load current and the alternator current are depicted to decrease to zero.

In some implementations, when the alternator is turned off, the solar charge controller can change its voltage setpoint to standard charging voltage for the type of battery in use, such as VBATT. This can be accomplished by, for example, using the current signal of the alternator to determine the presence and/or activity of the alternator.

In the example of FIG. 1C, if the vehicle was turned off abruptly during charge interval 127 and the alternator ceases to generate current, the solar charge controller can use the current sensor to detect this condition and drop to a voltage profile of VSOL1, which may be VBATT or slightly lower. This will prevent the battery from being overcharged. In addition to changing the voltage profile, the current profile can be increased to ISOL1 such that there is sufficient current to both charge the battery and power the radio, thereby resulting in reverting to the mode as described for FIG. 1A. It should be appreciated that if the engine is turned back on, the solar charge controller can sense the alternator current and switch back to the VSOL2 and ISOL2 voltage and current profile.

Therefore, FIG. 1C illustrates how both the alternator current source and solar current source can provide current to an electrical load and charge a battery in a fuel saving manner without overcharging the battery, even if the alternator is turned off abruptly. The improved fuel economy arises from both the shortened charging time and the substitution of a portion of alternator current by solar current for powering an electrical load during a non-charging interval.

When the solar panel voltage regulator is set to the elevated voltage setpoint of VSOL2, overvoltage protection is provided by setting ISOL2 to a value such that there is no net charge current to the battery. In some implementations, the value of ISOL2 is not based on directly or indirectly sensing an actual electric load current, but is instead predetermined using the known characteristics of the vehicle. For example, a particular vehicle may have a known minimum electrical load current after the engine is turned on. By setting ISOL2 below this minimum electrical load current when the alternator is detected to be running, overvoltage protection is provided. For example, in the operational scenarios represented by FIGS. 1A-C, if the radio has a current consumption similar to the minimum electrical load current, the fuel economy improvement is optimized. However, if the radio has a current consumption, for example, 3 Amps higher than the minimum electrical load current value that ISOL2 is set to, and the solar panel is capable of providing the extra 3 Amps, the fuel economy improvement is not optimized.

In certain implementations, ISOL2 can be configured using closed-loop feedback. By increasing ISOL2 to just below the actual electrical load current, fuel economy improvements based on a shortened charging interval and alternator current substitution during a non-charging interval are better optimized. For example, the feedback can be used to track both positive and negative changes in the actual electric load current, such as when vehicle accessories are being turned on or off.

In some implementations, during the charging interval, by increasing ISOL2 to just below the actual electrical load current to be closer to the combined electrical load current and battery load current, fuel economy improvements can be further optimized. For example, monitoring the current of a second source, such as the alternator, can be used as feedback to the first source, such as the solar panel, such that the first source can increase its output current until the current of the second source is nominally above 0 amps. This allows the first source to dynamically maximize its current contribution while minimizing the current contribution of the second source.

FIG. 1D corresponds to an example implementation using alternator current feedback to modify ISOL2. FIG. 1D corresponds to a sequence including vehicle engine ignition with a fully charged battery, keeping the engine on, turning on the radio, letting the battery fully charge using both solar current and alternator current, turning on the window defrosters, and then turning off the engine, radio, and window defrosters.

For FIG. 1D, the voltage and current traces at times t0 and t1 are interpreted similarly as for FIG. 1C. However, charging interval 145 is shorter than the charge interval 127 for FIG. 1C. Specifically, solar current 147 during charging interval 145 is not limited to being below the electrical load current corresponding to radio load current 111, and therefore the battery load current 149 can be greater than battery load current 125 for FIG. 1C.

In FIG. 1D, the increased solar current for charging the battery arises because the feedback loop is attempting to bring the alternator current down to a threshold of 0.5 amps. To drive down the alternator current, the battery voltage can increase such that the alternator voltage regulator can supply a smaller field to the rotor. The solar charge controller increases the battery voltage by increasing the solar current.

In some implementations, the solar current is limited by the current capacity of the solar panel, which as discussed earlier for FIG. 1A is limited to ISOL1.

Since the alternator is operating and therefore the alternator is controlling the battery voltage, the solar charge controller is configured to the VSOL2/ISOL2 profiles. During the charging interval 145, by sensing that the alternator current output has not yet been driven to a low threshold such as 0.5 amps, ISOL2 is increased up to the ISOL1 maximum solar current output value. During the charging interval, improved fuel economy is achieved using the feedback mechanism by further shortening the charging interval 145 relative to FIG. 1C.

Battery charging is completed at t2D, when the battery voltage reaches VALT. At time t2D, ISOL2 is decreased to slightly below the radio load current 111, since the battery load current is zero because the battery has been charged. Non-charging interval 139 of FIG. 1D also differs from non-charging interval 129 of FIG. 1C. Specifically, during non-charging interval 139 of FIG. 1D, the window defrosters are turned on at time t3, and the combined electrical load current of the radio and window defrosters correspond to increased electrical load current 137.

Again, since the alternator is operating and therefore the alternator is controlling the battery voltage, the solar charge controller is configured to the VSOL2/ISOL2 profiles. ISOL2 was previously configured to be slightly below the radio load current 111. If ISOL2 is not increased to slightly below the increased electrical load current 137, the alternator output current will increase. For example, the alternator output current increases because the battery starts to drain faster and the battery voltage drops to the point where the alternator voltage regulator causes the alternator to increase current to re-charge the battery voltage. As another example, the alternator output increases to supply current to the window defrosters.

However, in implementations where ISOL2 can be increased to slightly below the increased electrical load current 137, such as by using feedback from a current sensor at the output of the alternator, the additional current consumed by the window defrosters can be provided by the solar charge controller rather than the alternator. In FIG. 1D, this is illustrated by solar current 141 being elevated to have a value corresponding to ISOL2', and the alternator current 143 remaining flat during non-charging interval 139, which represents no increased loading of the engine by the alternator despite turning on the window defrosters. In this example, ISOL2' is less than ISOL1, the maximum current output of the solar panels.

The radio, window defrosters, and the engine are turned off at t4, in which the electrical load current and the alternator current are depicted to decrease to zero.

In the example of FIG. 1D, similar to FIG. 1C, if the vehicle is turned off abruptly during charging interval 145 and the alternator ceases to generate current, the solar charge controller can use the current sensor to detect this condition and drop to a voltage profile of VSOL1, which may be VBATT or slightly lower. This will prevent the battery from being overcharged. In addition to changing the voltage profile, the current profile can be set to ISOL1, It should be appreciated that if the engine is turned back on, the solar charge controller can sense the alternator current and switch back to the VSOL2 and ISOL2 voltage and current profile.

Therefore, FIG. 1D illustrates how fuel economy improvements can be optimized by minimizing the deviation between ISOL2 and the actual combined electrical load current and battery load current using alternator current feedback. It should be appreciated that because ISOL2 is kept below the actual combined electric load current and battery load current, the overvoltage protection as described herein is still provided.

Figure 2:
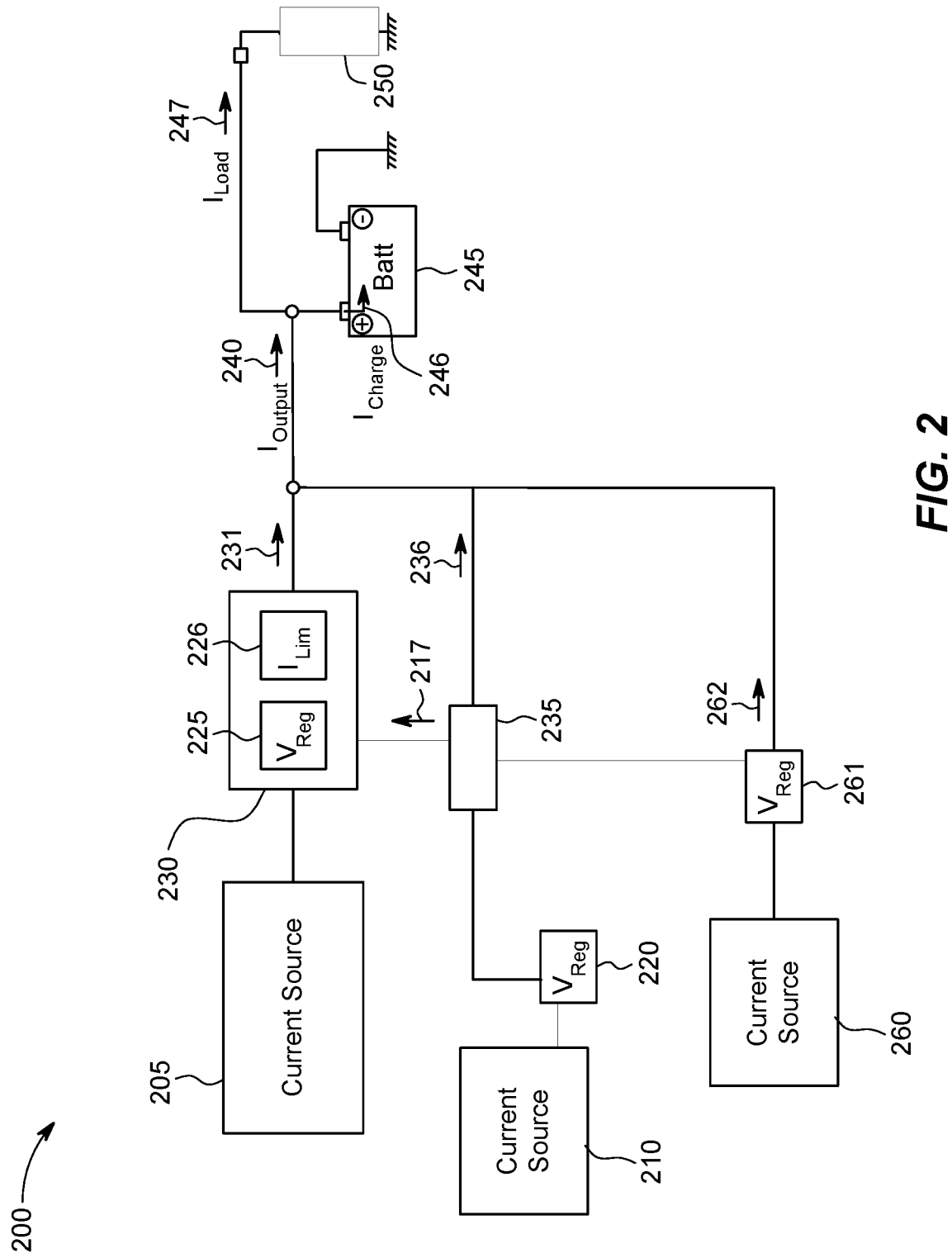
FIG. 2 is a simplified block diagram of a specific implementation of a multiple current source prioritization circuit with overvoltage protection.

FIG. 2 is a simplified block diagram of a specific implementation of a multiple current source prioritization circuit with overvoltage protection. Multiple current source prioritization circuit 200 includes a first input 236 configured to interface to a first current source 210 having a first voltage regulator 220. FIG. 2 also depicts a second input 231 configured to interface to a second current source 205 having a second voltage regulator 225 and a current limiter 226. FIG. 2 further depicts output 240 configured to interface to battery 245 having a charge/discharge current 246 and an electrical load 250 having an electrical load current 247.

FIG. 2 includes first circuitry 235 configured to generate one or more outputs 217 that represent a particular state of first current source 210. For example, the particular states can include a first state corresponding to first current source 210 being active and having a first voltage setpoint for the first voltage regulator 220, and a second state corresponding to first current source 210 being inactive.

FIG. 2 also includes second circuitry 230 configured to respond to when the one or more outputs 217 of first circuitry 235 represents that first current source 210 is in the first state. Second circuitry 230 can respond by setting second voltage regulator 225 to a second voltage setpoint that is higher than the first voltage setpoint. In some implementations, the second voltage setpoint can be higher than the first voltage setpoint by at least 0.5 Volts. This is to provide a margin against voltage noise. For example, a margin of 0.1 Volts may not be sufficient. One having ordinary skill in the art will recognize that the threshold to be sufficiently higher than noise may be lower than 0.5 Volts, e.g., at least 0.2 Volts, 0.3 Volts, or 0.4 Volts.

Second circuitry 230 can also respond by setting current limiter 226 to a first current limit at the output of second voltage regulator 225. In some implementations, the first current limit is below electrical load current 247. When second circuitry 230 is configured with the second voltage setpoint for second voltage regulator 225 and first current limit for current limiter 226, the current at output 240 can include an amount of current from second current source 205 corresponding to the first current limit. Because the first current limit is below the electrical load current 247, multiple current source prioritization circuit 200 does not charge battery 245 to a voltage above the first voltage setpoint associated with first voltage regulator 220 for first current source 210.

In FIG. 2, when one or more outputs 217 of the first circuitry represents that first current source 210 is in a second state, corresponding to being inactive, second circuitry 230 can set second voltage regulator 225 to a third voltage setpoint that is lower than the second voltage setpoint. In some implementations, second circuitry 230 can also set a second current limit for current limiter 226 at the output of second voltage regulator 225 that is above electrical load current 247. When second circuitry 230 is configured with the third voltage setpoint for second voltage regulator 225 and the second current limit for current limiter 226, the current at output 240 can include an amount of current from second current source 205 corresponding to the second current limit. Because the second current limit can be above the electrical load current 247, multiple current source prioritization circuit 200 can charge battery 245 to the third voltage setpoint associated with second voltage regulator 225 for second current source 205. Since the third voltage setpoint is below or equal to the second voltage setpoint, battery 245 is not charged above the second voltage setpoint.

In some implementations, multiple current source prioritization circuit 200 can also include a third input 262 configured to interface to a third current source 260 having a third voltage regulator 261. In such implementations, when first circuitry 235 represents that the first current source and the third current source are active, second circuitry 230 can further be configured to set third voltage regulator 261 to a voltage setpoint higher than the voltage setpoint for first voltage regulator 220 and lower than the voltage setpoint for second voltage regulator 225. In such an example, as battery 245 is being charged, first current source 210 will stop supplying current above a nominal current before third current source 260 because the voltage setpoint for first current source 210 is reached by battery 245 before reaching the voltage setpoint for third current source 260. (The first current source 210 will supply a nominal current to regulate voltage). When the voltage for battery 245 reaches the voltage setpoint for third current source 260, battery 245 is no longer being charged because third current source 260 is no longer supplying current and second current source 205 supplies a current that is less than electrical load current 247. Therefore, third current source 260 and second current source 205 are prioritized over first current source 210, second current source 205 is prioritized over third current source 260, and second current source 205 is current limited to provide battery overvoltage protection.

It should be appreciated that the specific order of prioritization can be determined based on the ordered values of voltage setpoints for each current source. For example, if third voltage regulator 261 is instead set to a voltage setpoint lower than the voltage setpoint for first voltage regulator 220, first current source 210 is instead prioritized over third current source 260. It should further be appreciated that the number of current sources can be increased, and prioritization between current sources can be configured based on ordering voltage setpoints as described herein.

Continuing the example where third current source 260 is included, when one or more outputs 217 of the first circuitry represents that first current source 210 and third current source 260 are both inactive, second circuitry 230 sets second voltage regulator 225 to a voltage setpoint that is safe for battery 245. Second circuitry 230 can also set a second current limit for current limiter 226 at the output of second voltage regulator 225 that is above electrical load current 247. Similar to as described above, this configuration of second current source 205 allows battery 245 to charge while still providing overvoltage protection.

Figure 3:
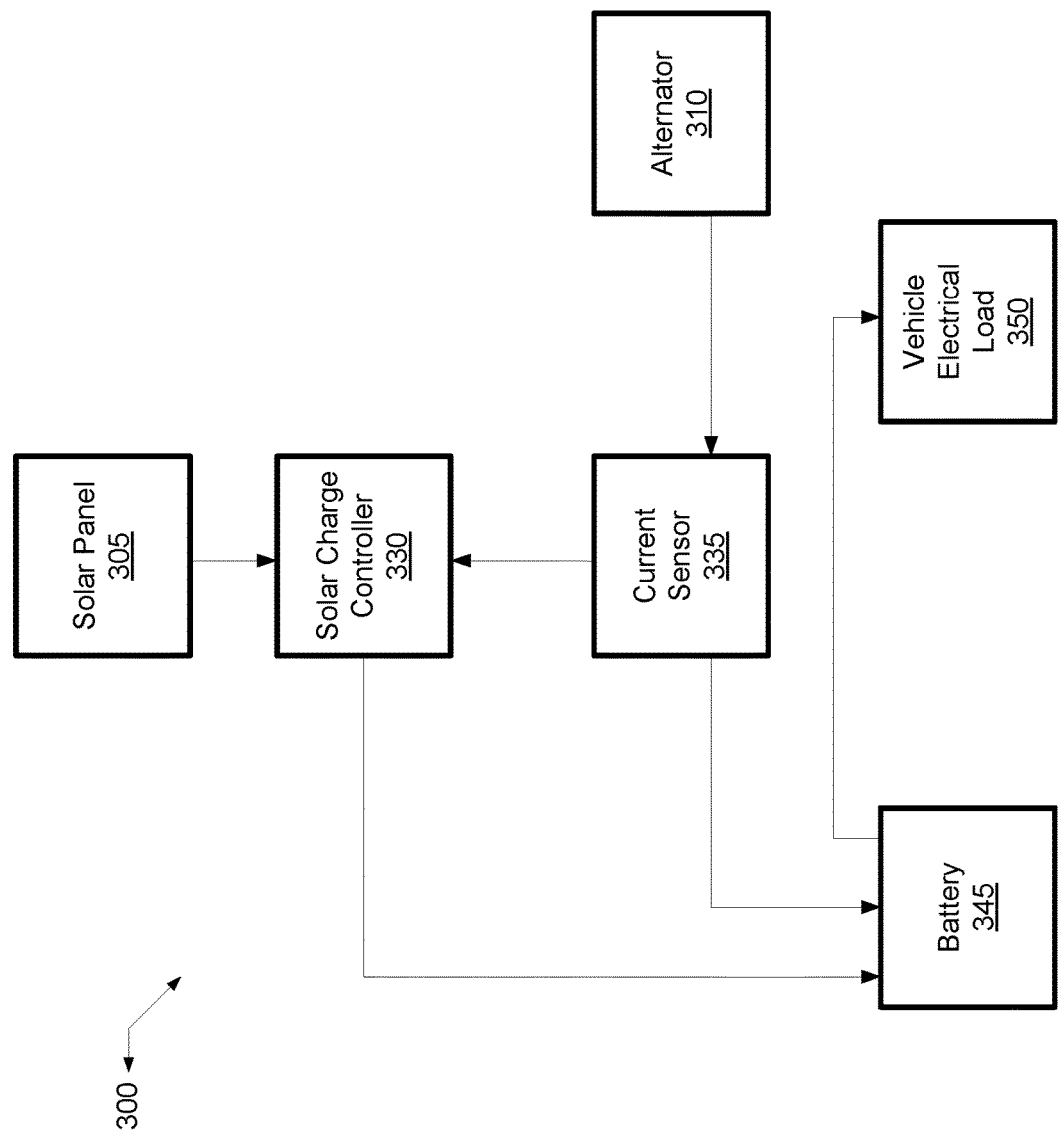
FIG. 3 is a simplified block diagram of a specific implementation of a multiple current source prioritization circuit with overvoltage protection for a vehicle.

FIG. 3 is a simplified block diagram of a specific implementation of a multiple current source prioritization circuit with overvoltage protection for a vehicle.

It should be appreciated that reference to vehicle may be in the context of a wide variety of applications, including personal, recreational, professional, commercial, or industrial uses. As nonlimiting examples, vehicle may include an automobile, such as station wagons, sedans, vans, and sport utility vehicles. A commercial vehicle can be used for the transportation of persons or the transportation of property, including packages (for example, trucks and pickups). Off highway vehicles can include racing motorcycles, trail bikes, mini bikes, dune buggies, all-terrain vehicles, jeeps, and snowmobiles. A vehicle can be a trailer coach designed for human habitation for recreational, industrial, professional, or commercial purposes that can be drawn by another vehicle. A vehicle may include a vessel such as motorboats, amphibious vessels, and inflatable vessels with motors, shuttlecraft, or jet skis. A vehicle may include aerial vehicles such as drones, personal aircraft, commercial aircraft, and so forth.

FIG. 3 depicts a system 300 having two sources of current, alternator 310 and solar panel 305, that can charge battery 345. Solar charge controller 330 controls a charging current from solar panel 305 to battery 345.

Solar panel 305 may include, for example, crystalline silicon (c-Si) solar cells made of multicrystalline and monocrystalline silicon, or thin-film solar cell arrays using cadmium telluride, CIGS or amorphous silicon.

Battery 345 can be an automotive battery, such as a SLI battery (starting-lighting-ignition battery) that is connected to vehicle electric load 350, such as a starter motor. For example, battery 345 can be a lead-acid car battery using six series-connected cells to provide a nominal 12 volt system, as often found in passenger vehicles and light trucks, or twelve cells for a 24 volt system typically used in heavy trucks or earth-moving equipment. It should be appreciated that charging all electric vehicle batteries and hybrid electric vehicle batteries are also contemplated for the techniques disclosed herein.

Solar charge controller 330 can use, for example, Maximum Power Point Tracking (MPPT), Maximum Power Point Control (MPPC), Pulse Width Modulation (PWM), or simplified DC/DC converters. In some implementations, if solar panel 305 is sized to not exceed the voltage and current maximums for battery 345, solar charge controller 330 can be eliminated altogether.

In FIG. 3, current sensor 335 can measure the output current of alternator 310 and provide feedback to solar charge controller 330. Current sensor 335 can be implemented using a wide variety of circuit designs that detect electric current (AC or DC) and generates an analog voltage or current, or one or more digital outputs. As nonlimiting examples, current sensor 335 can be implemented using Hall Effect devices, resistive devices, transformer devices, interferometric devices, fluxgate devices, coil devices, and so forth.

Solar charge controller 330 can use current sensor 335 to determine if alternator 310 is generating output current. For example, if the output of alternator 310 is 0 amps, solar charge controller 330 will remove output current limits associated with the solar panel 305 and set a voltage setpoint VSOL1 for a voltage regulator for solar charge controller 330 to a value that corresponds to an industry standard for the battery type being charged. For example, for a lead acid battery for a nominal 12 V vehicle electronics system, an industry standard value of about 13.8 to about 14 V can be used.

If the current output of alternator 310 is greater than a nominal threshold current, such as about 0.5 A, current sensor 335 can indicate the alternator 310 is supplying current. It should be appreciated that values other than 0.5 A can be used. Solar charge controller 330 can use the current sensor feedback signal to set a voltage regulator setpoint to a VSOL2 value that is higher than VSOL1. For example, VSOL2 can be about 14.6 V. Solar charge controller 330 can also use the current sensor feedback signal to set solar panel 305 to have an output current limit ISOL2 such that alternator 310 outputs a current that is below the threshold alternator current. For example, as the electrical load current and battery load current change in the vehicle, alternator 310 can have an output current that will increase or decrease to match the changes. However, by having solar charge controller 330 adjust the output current limit corresponding to solar panel 305 to correspondingly increase or decrease, the output current of alternator 310 can be kept at or slightly above the threshold alternator current. This can minimize the mechanical load of alternator 310 on the engine. By tracking the output current of alternator 310 and adjusting ISOL2 such that there is no net charging current, battery 345 can be prevented from overcharging despite the voltage regulator for solar charge controller 330 being set to a voltage setpoint that is higher than the industry standard for battery 345.

Figure 4:
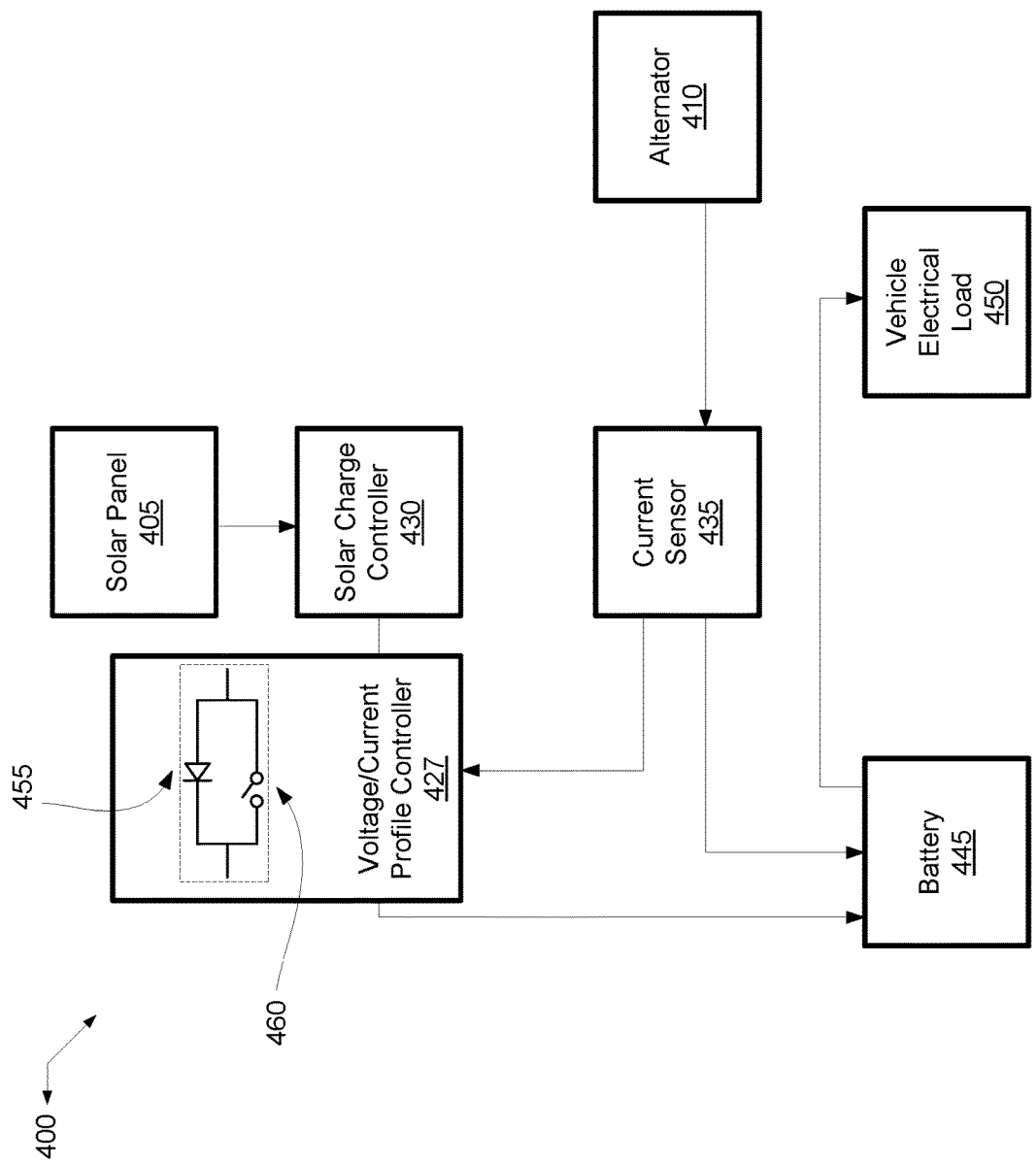
FIG. 4 is another simplified block diagram of a specific implementation of a multiple current source prioritization circuit with overvoltage protection for a vehicle.

FIG. 4 is another simplified block diagram of a specific implementation of a multiple current source prioritization circuit with overvoltage protection for a vehicle. Similar to FIG. 3, FIG. 4 depicts a system 400 having two sources of current, alternator 410 and solar panel 405, that can charge battery 445. Solar charge controller 430 controls a charging current from solar panel 405 to battery 445. Current sensor 435 determines if a vehicle engine is on by detecting if alternator 410 is generating output current.

In contrast to FIG. 3, in FIG. 4, solar charge controller 430 does not provide closed loop control based on the output of current sensor 435. Instead, the output of current sensor 435 is provided to voltage/current profile controller 427. Voltage/current profile controller 427 can use a signal from current sensor 435 to switch between two voltage setpoints, VSOL1 and VSOL2. In some implementations, providing the outputs of current sensor 435 to voltage/current profile controller 427 instead of solar charge controller 430 allows existing commercial off-the-shelf solar charge controllers to be enhanced with the current prioritization and overvoltage protection techniques described herein.

In certain implementations, current sensor 435 can include a relay circuit that is determined by a current threshold. For example, when the alternator current is less than I0, voltage/current profile controller 427 can be configured to a voltage setpoint of VSOL1. In some implementations, I0 can be about 0.5 amps, and VSOL1 about 13.8 V.

When the alternator current is above I0, corresponding to when the alternator is operating, the higher voltage setpoint of VSOL2 can be used. In some implementations, VSOL2 can be about 14.6 V. Similarly, when the alternator is operating, the output current of voltage/current profile controller 427 can be limited to a value of ISOL2 that is slightly below the minimum value of vehicle electric load 450. This causes the battery voltage to be determined by alternator 410 since there is no net charge current after the voltage setpoint for alternator 410 is reached and alternator 410 stops outputting current.

In some implementations, voltage/current profile controller 427 can include a current limiter. In other implementations, the output current of voltage/current profile controller 427 can be limited by configuring the maximum current of solar charge controller 430 or sizing solar panel 405 such that the maximum output of solar panel 405 does not exceed the minimum electrical load current.

The selection between VSOL1 and VSOL2 for voltage/current profile controller 427 can be implemented with passive devices or active devices that cause a voltage drop that can be bypassed with a relay depending on the state of the current sensor output. For example, one or more diode(s) can be matched to the voltage difference between VSOL1 and VSOL2.

FIG. 4 illustrates an example of a diode 455 and a relay 460 arranged in parallel that can be included in voltage/current profile controller 427. When current sensor 435 indicates that the alternator is on, relay 460 can be configured to short-circuit the two terminals of diode 455 in order to bypass diode 455 such that the voltage setpoint, such as VSOL1, associated with solar charge controller 430 is provided to battery 445.

When current sensor 435 indicates that the alternator is off, relay 460 can be disconnected so that the output current of solar charge controller 430 flows through diode 455, thereby causing a voltage drop such that a lower voltage value of VSOL2=VSOL1−VDIODE is provided to battery 445.

Figure 5:
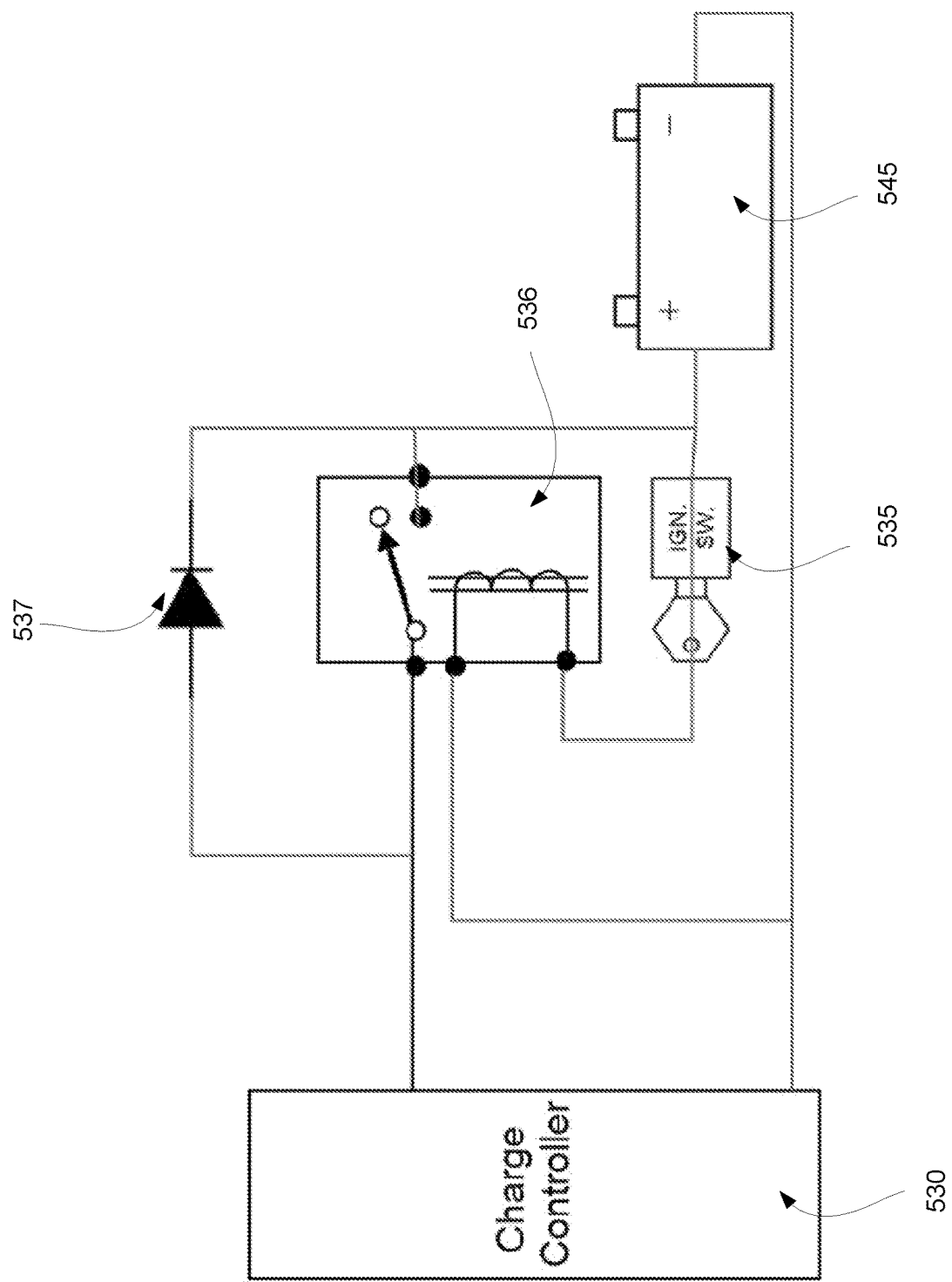
FIG. 5 is another simplified block diagram of a specific implementation of a multiple current source prioritization circuit with overvoltage protection.

FIG. 5 is yet another simplified block diagram of a specific implementation of a multiple current source prioritization circuit with overvoltage protection. In some implementations, a device that indicates the state of the vehicle and/or alternator can be used instead of or in conjunction with a current sensor. For example, the state of the vehicle and/or alternator can be determined using a vehicle seat occupancy sensor, an ignition switch sensor, a signal from a Controller Area Network (CAN) bus interface, and so forth.

As a nonlimiting example of a device for indicating the state of the vehicle, FIG. 5 depicts relay 536 that indicates whether ignition switch 535 corresponds to a vehicle engine being on or off. When ignition switch 535 indicates that the vehicle engine is on, and therefore the alternator is outputting current, the switch in relay 536 can be closed such that the output of charge controller 530 is provided to battery 545. When ignition switch 535 indicates that the vehicle engine is off, the switch in relay 536 can be opened such that the output of charge controller 530 passes through diode 537, thereby resulting in a voltage drop. The output of diode 537 can then be provided to battery 545.

In the example of FIG. 5, charge controller 530 can have a charging algorithm with a voltage setpoint of VSOL. An alternator (not shown in FIG. 5) can have a voltage regulator with a voltage setpoint of VALT. These two voltages, VALT and VSOL, can vary depending on environmental conditions and the make/model of the alternator and charge controller 530. Consequently, for a given system with off the shelf components, VALT can be less than or equal to or greater than VSOL. This gives rise to inconsistencies in the percentage of power delivered from each source and the final battery voltage if VALT and VSOL are different.

When the current of charge controller 530 can be limited to less than the electric load current and the voltage setpoint VSOL of charge controller 530 can be increased to be greater than VALT, the current contribution from charge controller 530 will be maximized and the alternator current will be minimized while allowing the alternator to regulate the final battery voltage. This reduces the mechanical load on the engine which increases fuel efficiency. Battery 545 will continue to be charged in accordance with the vehicle charging system design since the alternator will regulate the final battery voltage.

In certain implementations, the source hardware and control functions can be integrated into the charge controller 530. In some implementations, the source hardware and control functions can be integrated into the vehicle electrical/electronic system and/or other higher level system.

Figure 6:
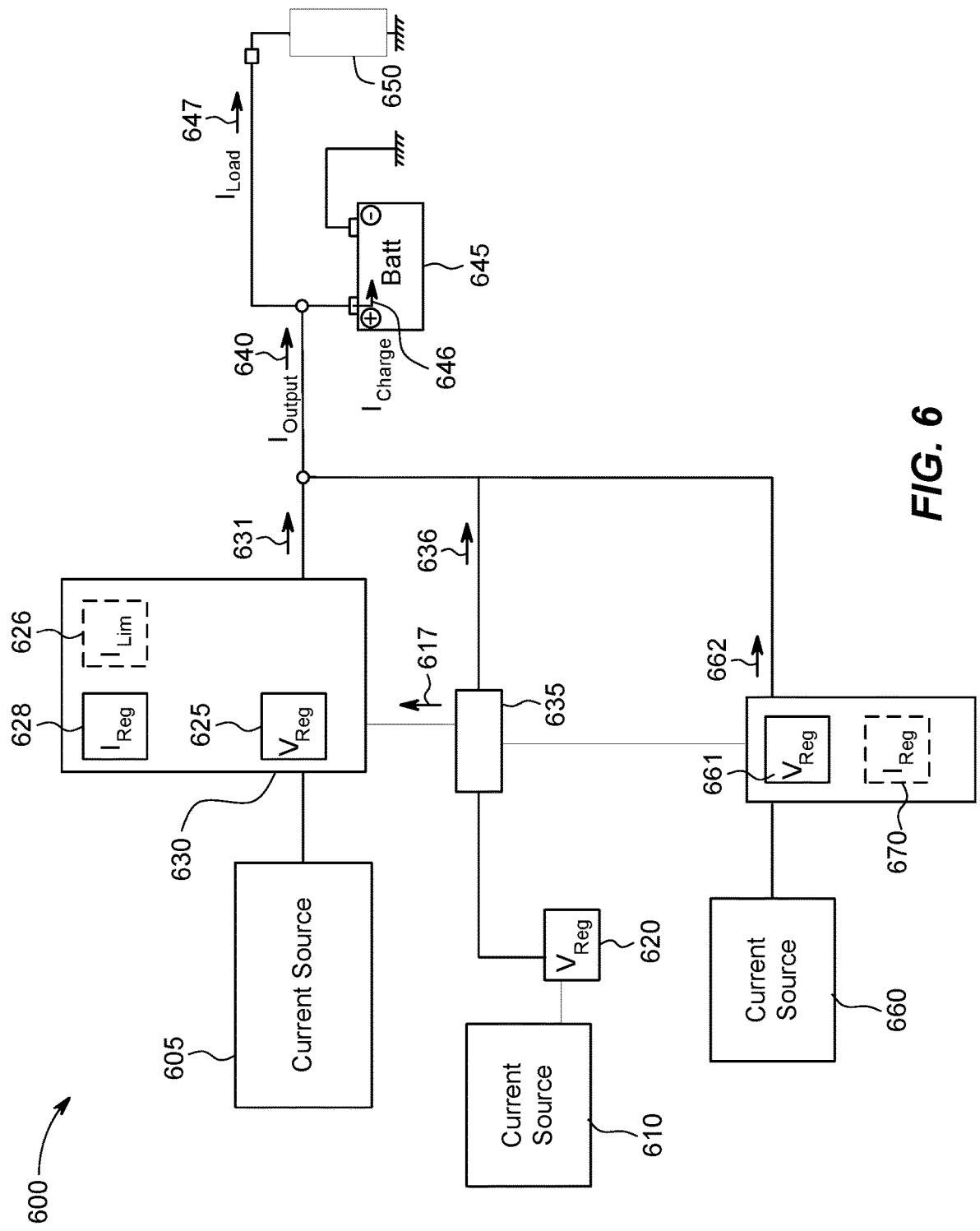
FIG. 6 is another simplified block diagram of a specific implementation of a multiple current source prioritization circuit with overvoltage protection.

FIG. 6 is another simplified block diagram of a specific implementation of a multiple current source prioritization circuit with overvoltage protection. Multiple current source prioritization circuit 600 includes a first input 636 configured to interface to a first current source 610 having a first voltage regulator 620.

FIG. 6 also depicts a second input 631 configured to interface to a second current source 605 having a first current regulator 628. FIG. 6 further depicts output 640 configured to interface to battery 645 having a charge/discharge current 646 and an electrical load 650 having an electrical load current 647.

FIG. 6 includes first circuitry 635 configured to generate one or more outputs 617 that represent a particular state of first current source 610. For example, the particular states can include a first state corresponding to first current source 610 being active and having a first voltage setpoint for the first voltage regulator 620, and a second state corresponding to first current source 610 being inactive.

FIG. 6 also includes second circuitry 630 configured to respond to when the one or more outputs 617 of first circuitry 635 represents that first current source 610 is in the first state. Second circuitry 630 can respond by setting first current regulator 628 to a constant current value that results in the current from the first current source 610 to be slightly greater than 0 amps. Second circuitry 630 can also respond by setting current limiter 626 to a first current limit at the output of first current regulator 628 to below electrical load current 647. In various implementations, the current limiting capabilities of current limiter 626 is incorporated into first current regulator 628, such that a single device performs constant current regulation and current limiting functions. In a range of implementations, current limiter 626 and first current regulator 628 are implemented in separate devices (e.g., a first application specific integrated circuit (ASIC) performing current regulation functions, followed by a second ASIC performing current clamping functions)

When second circuitry 630 is configured with the first current limit for first current regulator 628 (or for current limiter 626), the current at output 640 can include an amount of current from second current source 605 corresponding to the first current limit. Because the first current limit is below the electrical load current 647, multiple current source prioritization circuit 600 does not charge battery 645 to a voltage above the first voltage setpoint associated with first voltage regulator 620 for first current source 610.

In some implementations, second circuitry 630 also includes second voltage regulator 625. In certain implementations, when the one or more outputs 617 of first circuitry 635 represents that first current source 610 is in the first state, second circuitry 630 can respond by setting first current regulator 628 to a constant current value (e.g., corresponding to the first current limit), while maintaining second voltage regulator 625 at a pre-existing voltage setpoint (i.e., voltage setpoint of second voltage regulator 625 is not modified based on detecting that first current source 610 is in the first state). In various implementations, when the one or more outputs 617 of first circuitry 635 represents that first current source 610 is in the first state, second circuitry 630 can respond by setting first current regulator 628 to a constant current value (e.g., corresponding to the first current limit) while modifying the second voltage regulator 625 to a lower or higher voltage setpoint (i.e., voltage setpoint of second voltage regulator 625 is modified based on detecting that first current source 610 is in the first state).

In some implementations, when one or more outputs 617 of the first circuitry represents that first current source 610 is in a second state, corresponding to first current source 610 being inactive, second circuitry 630 can disable or bypass first current regulator 628 and use second voltage regulator 625 to regulate second current source 605. In such scenarios, second voltage regulator 625 operates using a charging method with boost, bulk, and float voltage setpoints that prevent battery 645 from being overcharged.

In particular implementations, second voltage regulator 625 and first current regulator 628 are implemented as separate devices (e.g., a first ASIC performing functions including constant current output, a second ASIC performing functions including boost/bulk/float battery charging logic), and the separate devices are logically switched (e.g., enable/disable each device) or physically switched (e.g., relay switch to selectively electrically couple each device within a circuit).

In a range of implementations, second voltage regulator 625 and first current regulator 628 are integrated within a single device. For example, a device implementing boost/bulk/float battery charging logic is configured to act as a constant current source.

In certain implementations, when one or more outputs 617 of the first circuitry represents that first current source 610 is in a second state, corresponding to first current source 610 being inactive, second circuitry 630 can set first current regulator 628 to a constant current value corresponding to a second current limit that is above electrical load current 647. When second circuitry 630 is configured with the second current limit for first current regulator 628, the current at output 640 can include an amount of current from second current source 605 corresponding to the second current limit. Because the second current limit can be above the electrical load current 647, multiple current source prioritization circuit 600 can charge battery 645. In particular implementations, a sensor (not depicted in FIG. 6) across the terminals of battery 645 can measure if the terminal voltage exceeds a battery voltage VBATT that indicates second circuitry 630 should stop providing charge current to battery 645 in order to prevent overcharging.

It should be appreciated that the charging of battery 645 using second voltage regulator 625 is different from the charging of battery 645 using first current regulator 626 with the second current limit that is above electrical load current 647. For example, constant current source charging of battery 645 is linear with respect to time, whereas constant voltage source charging of battery 645 is exponential with respect to time. As another example, for the scenarios corresponding to FIGS. 1A-1D as applied to the multiple current source prioritization circuit 600 which uses first current regulator 626, the battery voltage profile between times t1 and t2 (t2B-D for the respective scenarios FIG. 1B-1D) will differ relative to using constant voltage (e.g., using a voltage regulator) for charging.

In some implementations, multiple current source prioritization circuit 600 can also include a third input 662 configured to interface to a third current source 660 having a third voltage regulator 661. In such implementations, when first circuitry 635 represents that the first current source and the third current source are active, second circuitry 630 can further be configured to set first current regulator 628 to a constant current value no higher than a third current limit that results in the current from both the first current source 610 and the third current source 660 to be minimized if, for example, the current from both the first current source 610 and the third current source 660 is above or close to 0 amps (e.g., 0.5 amps). Because the third current limit is below the electrical load current 647, multiple current source prioritization circuit 600 does not charge battery 645 to a voltage above the first voltage setpoint associated with first voltage regulator 620 for first current source 610.

In certain implementations, the third voltage regulator 661 uses a voltage setpoint higher than the voltage setpoint for first voltage regulator 620. In such an example, as battery 645 is being charged, first current source 610 will stop supplying current above a nominal current before third current source 660 because the voltage setpoint for first current source 610 is reached by battery 645 before reaching the voltage setpoint for third current source 660. (The first current source 610 will supply a nominal current to regulate voltage). When the voltage for battery 645 reaches the voltage setpoint for third current source 660, battery 645 is no longer being charged because third current source 660 is no longer supplying current and second current source 605 supplies a current that is less than electrical load current 647. Therefore, third current source 660 and second current source 605 are prioritized over first current source 610, second current source 605 is prioritized over third current source 660, and second current source 605 is current limited to provide battery overvoltage protection.

In various implementations, the specific order of prioritization for the current sources other than the highest priority current source (e.g., second current source 605 associated with first current regulator 626) can be determined based on the ordered values of voltage setpoints for the remaining current sources. For example, if third voltage regulator 661 is instead set to a voltage setpoint lower than the voltage setpoint for first voltage regulator 620, first current source 610 is instead prioritized over third current source 660. It should further be appreciated that the number of current sources can be increased, and prioritization between current the remaining sources can be configured based on ordering voltage setpoints as described herein.

In a range of implementations, the specific order of prioritization can also be determined based on the ordered values of constant currents assigned to each current source that has respective current regulation. For example, in implementations where third voltage regulator 661 is associated with a second current regulator 670, second circuitry 630 can coordinate first current regulator 626 and second current regulator 670 such that the current generated by the second current source 605 is prioritized over the current generated by third current source 660. In various implementations, a current limit associated with the second current source 605 can be increased, and/or a current provided by first current source 610 can be minimized if the current provided by first current source 610 is detected to be slightly above or close to zero (e.g., 0.5 Amperes), and/or a current provided by third current source 660 can be minimized if the current provided by third current source 660 is detected to be above or close to zero (e.g., 0.5 Amperes).

In particular implementations, second current regulator 670 (and additional current regulators) can be implemented within second circuitry 630. In certain implementations, a particular current regulator in second circuitry 630 can be connected to different current sources. For example, second circuitry 630 can include a switching structure (not depicted in FIG. 6) that allows first current regulator 628 to be electrically coupled to the first current source 605, the second current source 610, the third current source 660, or any additional current source not depicted in FIG. 6, and second current regulator 670 to be electrically coupled to a different current source and one coupled to first current regulator 628.

Figure 7:
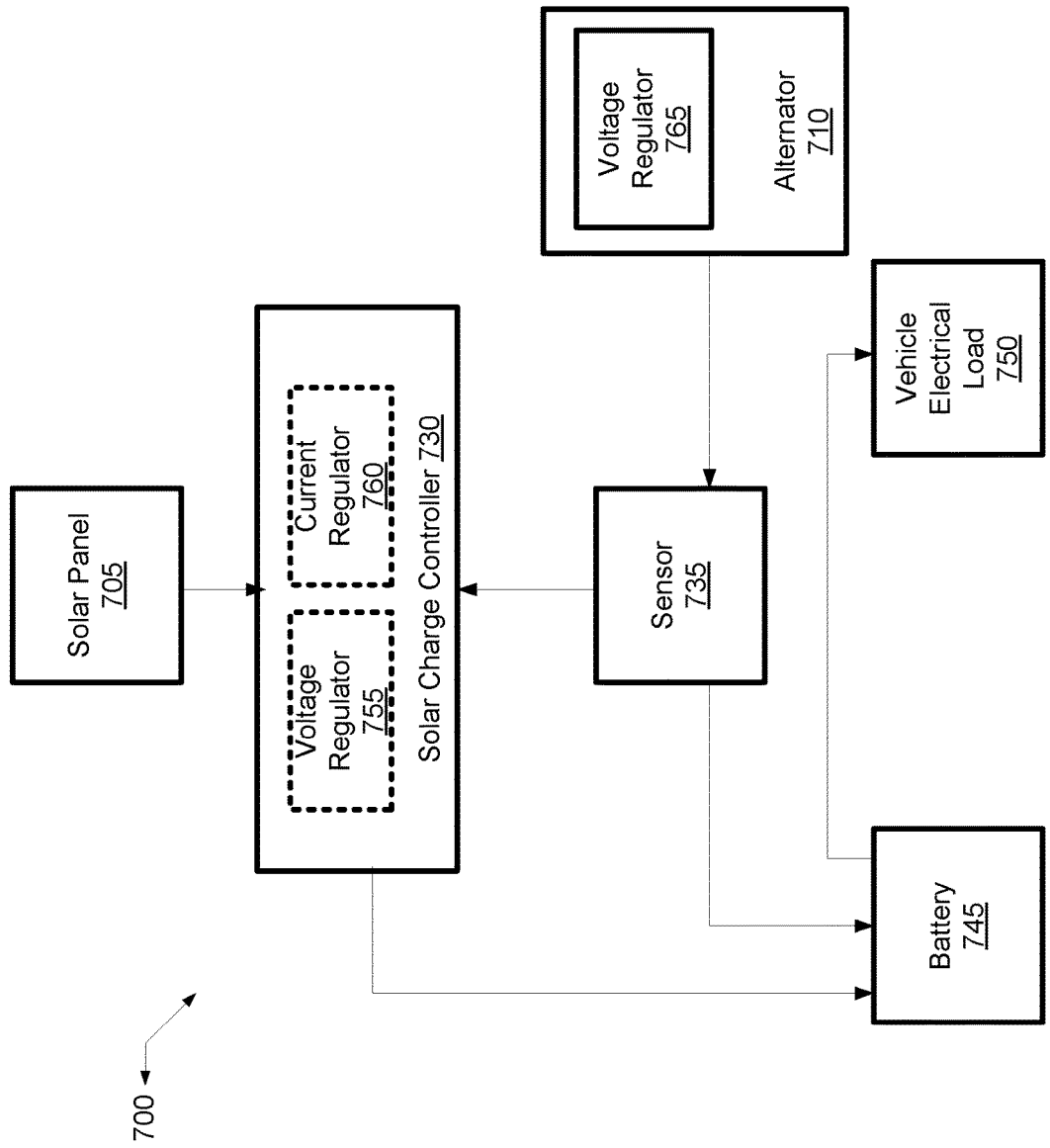
FIG. 7 is a simplified block diagram of another implementation of a multiple current source prioritization circuit with overvoltage protection for a vehicle battery.

FIG. 7 is a simplified block diagram of another implementation of a multiple current source prioritization circuit with overvoltage protection for a vehicle battery.

FIG. 7 depicts a system 700 having two sources of current, alternator 710 and solar panel 705, that can charge battery 745. Solar charge controller 730 controls a charging current from solar panel 705 to battery 745.

Solar panel 705 may include, for example, crystalline silicon (c-Si) solar cells made of multicrystalline and monocrystalline silicon, or thin-film solar cell arrays using cadmium telluride, CIGS or amorphous silicon.

Battery 745 can be an automotive battery, such as a SLI battery (starting-lighting-ignition battery) that is connected to vehicle electric load 750, such as a starter motor. For example, battery 745 can be a lead-acid car battery using six series-connected cells to provide a nominal 12 volt system, or twelve cells for a 24 volt system typically.

Solar charge controller 730 can use, for example, Maximum Power Point Tracking (MPPT), Maximum Power Point Control (MPPC), Pulse Width Modulation (PWM), or DC/DC converters.

For example, when vehicle electrical load 750 is connected to solar panel 705, the operating point of solar panel 705 may not provide peak power transfer. Specifically, the operating point on the current-voltage curve of solar panel 705 can vary with respect to variation in atmospheric conditions such as radiance and temperature, and therefore a static operating point may not be optimal for dynamically changing ambient conditions. In particular, the load impedance seen by solar panel 705 determines the operating point of solar panel 705, and by varying the impedance seen by solar panel 705, the operating point can be transitioned closer towards peak power transfer. In various implementations, solar panel 705 is a DC device, and DC-DC converters are utilized to transform the impedance of a source circuit (e.g., solar panel 705) to a load circuit (e.g., vehicle electrical load 750). For example, adjusting the duty ratio of the DC-DC converter results in an impedance change as seen by solar panel 705, and a particular impedance (or duty ratio) corresponds to peak power transfer between solar panel 705 and vehicle electrical load 750. In various implementations, by sampling solar panel 705 voltages and currents, the duty ratio of voltage regulator 755 can be adjusted as needed.

In some implementations, if solar panel 705 is sized to not exceed the voltage and current maximums for battery 745, voltage regulator 755 and/or current regulator 760 can be optional, as indicated by the dashed outline. For example, if the available power from solar panel 705 is sized to be less than the vehicle electric load 750, then the vehicle battery 745 voltage will be regulated by voltage regulator 765 for alternator 710, since the solar panel does not provide enough power to both charge battery 745 and satisfy vehicle electric load 750.

In certain implementations, where solar charge controller 730 also includes voltage regulator 755 that can operate concurrently with current regulator 760, solar charge controller 730 can set a voltage setpoint VSOL1 for voltage regulator 755 to a value VBATT that corresponds to an industry standard for the battery type being charged such that overvoltage conditions do not occur. For example, for a lead acid battery for a nominal 12 V vehicle electronics system, an industry standard VBATT value of about 13.8 to about 14 V can be used. In certain implementations, VBATT is no higher than the voltage setpoint VALT of a voltage regulator 765 for alternator 710 that is determined to be active (i.e., ON).

In FIG. 7, sensor 735 can measure the output current or voltage of alternator 710 and provide feedback to solar charge controller 730. For example, sensor 735 can be implemented using a wide variety of circuit designs that detect electric current or voltage (AC or DC) and generates an analog voltage or current, or one or more digital outputs. As nonlimiting examples, sensor 735 can be implemented using Hall Effect devices, resistive devices, transformer devices, interferometric devices, fluxgate devices, coil devices, vacuum tube devices, field-effect transistor devices, galvanometer devices, and so forth. In particular implementations, the input signal to sensor 735 is connected to an ignition source that provides a voltage presence when the vehicle is turned on, though it should be appreciated that the input signal to sensor 735 can be connected to a wide variety of other electrical nodes in a vehicular system.

Solar charge controller 730 can use sensor 735 to determine if alternator 710 is active. For example, solar charge controller 730 can detect the presence of voltage as indicated by sensor 735, and decide if alternator 710 is ON when the voltage presence is detected for greater or equal than, for example, about 5 seconds, and decide if alternator 710 is OFF when the voltage presence is not detected for greater or equal than, for example, about 5 seconds. In certain implementations, a voltage in the range of, for example, 10V-60V, indicates the presence of a voltage. As another example, if the current output of alternator 710 as indicated by sensor 735 is greater than a nominal threshold current, such as about 0.5 A, solar charge controller 730 can determine that alternator 710 is ON.

In response to determining that alternator 710 is active, solar charge controller 730 can set a current regulator setpoint for current regulator 760 in solar charge controller 730 to an ISOL2 value that is lower than the current being consumed by vehicle electrical load 750.

In various implementations, in addition to setting the current regulator setpoint for current regulator 760, solar charge controller 730 does not modify the voltage setpoint for voltage regulator 755 when the sensor feedback signal switches to indicating that the alternator 710 is ON (e.g., voltage presence at ignition source is above a threshold value for longer than a threshold duration, or supplied current from the alternator 710 is greater than a nominal threshold current, etc.). For example, for a DC/DC converter implementation of voltage regulator 755 in solar charge controller 730, the voltage setpoint of the output of the DC/DC converter remains at VSOL1 with a value of about 13.8-14 V when the sensor feedback signal switches to indicating that the alternator 710 is ON.

In a range of implementations, the voltage regulator setpoint of voltage regulator 755 in solar charge controller 730 can be modified when the sensor feedback signal switches to indicating that the alternator 710 is ON. It should be appreciated that because current regulator 760 in solar charge controller 730 is configured to act as a constant current source that prioritizes current from the solar panel 705 over current from the alternator 710, the voltage regulator setpoint of voltage regulator 755 in solar charge controller 730 does not need to be modified to be higher than a voltage setpoint of voltage regulator 765 in alternator 710 in response to determining that the alternator 710 is operating.

In various implementations, solar charge controller 730, in response to sensor 735 switching to indicating the alternator 710 is supplying ON, generates an indication to modify the voltage regulator setpoint to a fully adjustable voltage value. For example, the fully adjustable voltage value can be a first arbitrarily high setpoint value (e.g., 14.6 V for a lead acid battery for a nominal 12 V vehicle electronics system), where the effect of the first arbitrarily high setpoint value is to override the voltage regulator functionality (e.g., override a proportional-integral-derivative (PID) control loop that can limit power output), rather than to actually configure voltage regulator 755 in solar charge controller 730 to perform voltage regulation at the first arbitrarily high setpoint value (i.e., configuring voltage regulator 755 to a voltage setpoint value of 14.6 V does not cause the voltage regulator 755 to regulate its voltage output to 14.6 V, but instead overrides voltage regulation at the output of voltage regulator 755).

In particular implementations, voltage regulator 755 and current regulator 760 are implemented as separate devices, and the separate devices are logically switched (e.g., enable/disable each device) or physically switched (e.g., relay switch to selectively electrically couple each device within a circuit). For example, current regulator 760 can be implemented as any of a variety of electronic circuits that deliver or absorb an electric current which is independent of the voltage across it. Examples include but are not limited to passive current sources (e.g., a voltage source in series with a resistor, etc.), active current sources without negative feedback, active current sources with negative feedback, constant current diodes, constant current regulators (CCRs), Zener diode current sources, operational-amplifiers current sources, etc., that may be combined with a wide variety of current mirrors (e.g., Widlar, Wilson, etc.).

In a range of implementations, voltage regulator 755 and current regulator 760 are integrated within a single device. For example, a standard charge controller for performing voltage regulation using boost/bulk/float voltage setpoint control logic can be configured to maximum output current mode for performing current regulation (i.e., constant current mode).

In particular implementations, solar charge controller 730 can also use the sensor feedback signal to set current regulator 760 to have an output current limit ISOL2 such that alternator 710 outputs a current that is below a threshold alternator current (e.g., 0.5 A). For example, as the electrical load current and battery load current change in the vehicle, alternator 710 can have an output current that will increase or decrease to match the changes. However, by having solar charge controller 730 adjust the output current limit corresponding to current regulator 760 to correspondingly increase or decrease, the output current of alternator 710 can be kept at or slightly above the threshold alternator current. This can minimize the mechanical load of alternator 710 on the engine. By tracking the output current of alternator 710 and adjusting ISOL2 such that there is no net charging current, battery 745 can be prevented from overcharging despite that the current regulator for solar charge controller 730 is acting as a constant current source.

In a range of implementations, configuring current regulator 760 to have an output current limit for the output of solar panel 705 is concurrent with power transfer tracking, such as, for example, MPPT. For example, additional current regulation and/or current limiting can occur following the MPPT control mechanism (e.g., excess power is diverted to a resistive load), where the MPPT control may configure the voltage setpoint of DC/DC converters in response to dynamic ambient conditions. In various implementations, power transfer tracking may be disabled. For example, solar charge controller 730 can be configured to ensure that the output (e.g., current) from solar panel 705 is prevented from causing an overvoltage of battery 745, rather than being configured for maximizing power transfer from solar panel 705.

Figure 8:
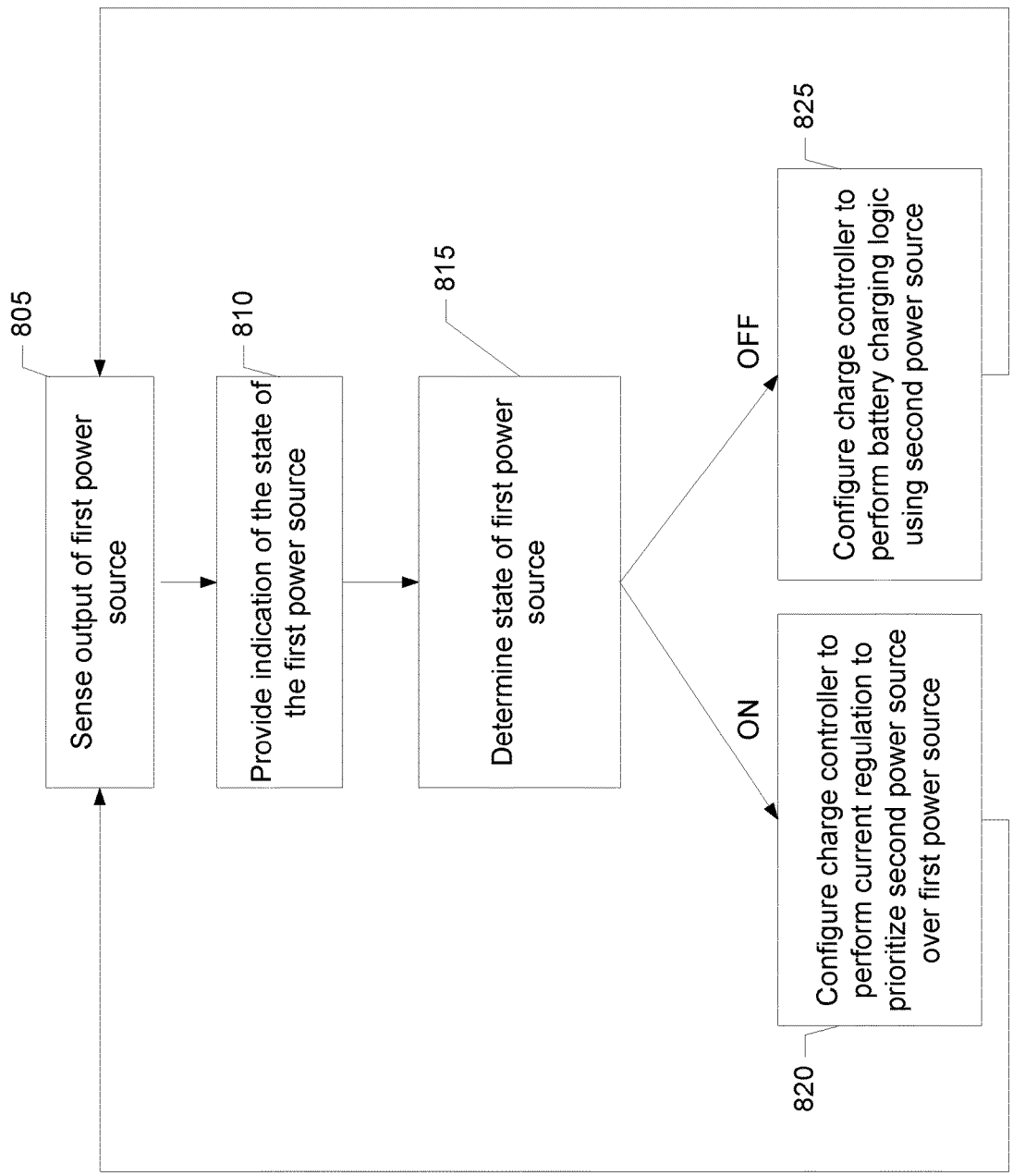
FIG. 8 is a flow diagram of a method for operating a multiple current source prioritization circuit with overvoltage protection for a battery.

FIG. 8 is a flow diagram of a method for operating a multiple current source prioritization circuit with overvoltage protection for a vehicle battery.

In FIG. 8 at step 805, a sensor measures the output current or voltage of a first power source (e.g., a vehicle alternator). At step 810, the sensor provides the feedback to a battery charge controller (e.g., MPPT or PWM solar charge controller, etc.) that controls the rate at which electric current is added to electric batteries. As used in the present specification, a battery charge controller may refer to either a stand-alone device, or to control circuitry integrated within a battery pack (with one or more battery cells), battery-powered device, or battery charger device. The sensor can be implemented using a wide variety of circuit designs that detect electric current or voltage (AC or DC) and generates an analog voltage or current, or one or more digital outputs (e.g., serial, parallel, pulse width modulated (PWM), USB 1.0/2.0/3.0, controller area network (CAN), IEEE 1394, Ethernet, etc.) that can be transmitted over wired or wireless interfaces.

In certain implementations, the sensor is connected to an ignition source that provides a voltage presence when the vehicle is turned on, though it should be appreciated that the sensor can be interfaced (via ohmic, inductive, capacitive coupling, etc.) to any electrical node in a vehicular system.

At step 815, the charge controller determines the state of the first power source. For example, the charge controller can detect the presence of a voltage in a particular range as indicated by the sensor and decide if the first power source is active when the voltage presence is detected for greater or equal than a temporal threshold, and decide if the first power source is inactive when the voltage presence is not detected for greater or equal than the temporal threshold.

It should be appreciated that a variety of techniques can be implemented to determine the state of the first power source, including but not limited to using a vehicle seat occupancy sensor, a current sensor, an ignition switch sensor, a Controller Area Network bus interface, an engine RPM sensor, a mass air flow sensor, a fuel flow sensor, an $O_2$ sensor, an oil pressure sensor, a sensor configured to detect a PWM signal from fuel injectors, a sensor configured to detect electrical noise detected on 12/24 volt system from an ignition coil, a frequency sensor, a speed sensor, a sensor configured to detect a threshold battery voltage, and a sensor configured to detect a signal between the alternator and a control module interface.

At step 820, in response to determining that the first power source is active, the charge controller is configured to perform current regulation to prioritize a second power source over the first power source. For example, a current regulator connected to the second power source is configured to a current regulator setpoint that causes a constant current output from the second power source to be provided to a load, such as a vehicle electrical load. For example, for a vehicle electrical load of 5 A, the charge controller is configured to act as a 4.5 A constant current source. Because the charge controller is configured to draw the 4.5 A constant current from the second power source (e.g., solar panels), the amount of current drawn from the first power source is decreased to 0.5 A, since the draw of the electrical load is 5 A. It should be appreciated that if the first power source is, for example, a vehicle alternator, reducing the amount of current drawn from the alternator increases fuel efficiency.

In some implementations, the value of the constant current is based on pre-determined calculations on the current consumption of a baseline vehicle electrical load, or based on unsupervised or supervised machine learning of patterns between indicated operating conditions (i.e., which devices are on, etc.) and load current consumption, or based on closed loop feedback (e.g., constant current value is modified such that the current measured by a sensor measuring the output of the first power source converges to a nominal threshold value above 0, such as 0.5 A), or any combination thereof.

It should be appreciated that by maintaining the constant current value (e.g., 4.5 A) to below the current drawn by the electrical load from the battery (e.g., 5 A), the battery itself will not be overcharged due to the insufficient current for both charging the battery and powering the load, and therefore the battery is protected from overvoltage conditions, irrespective of the voltage setpoint for any voltage regulator that may be in the charge controller.

The charge controller can periodically communicate with the sensor, which detects the output of the first power source at step 805, to determine when the first power source switches from active to inactive (or inactive to active), and thereby terminate or initiate operation in constant current mode.

For example, at step 825, in response to determining that the first power source has switched from active to inactive, the charge controller terminates constant current mode and begins to execute battery charging logic (e.g., three-stage boost/bulk/float, two-stage bulk/float, absorption, qualification, equalization, etc.) using the second power source. It should be appreciated that because the first power source is inactive, the second power source is taking priority over the first power source. It should be appreciated that boost/bulk/float control logic is one example from a wide variety of battery charging control algorithms that are compatible with the disclosed systems and techniques.

While the description above chiefly describes systems having a single battery, the techniques may be used with multiple batteries. For example, a system according to certain implementations may include multiple crank batteries or one or more crank batteries coupled with one or more auxiliary batteries. In some implementations, one or more crank batteries and one or more auxiliary batteries can be installed with an electrical switching device.

It should be noted that certain implementations of the multiple current source prioritization circuits with overvoltage protection as described herein can meet the growing need for high efficiency energy systems. Multiple current source prioritization circuits having the characteristics as described herein are important for the continuing evolution of fuel efficiency standards for automotive, maritime, aviation, and other applications. Various implementations described herein may be implemented using any in a variety of standard or proprietary discrete electronics or integrated semiconductor processes. In addition, it should be noted that implementations are contemplated that may employ a much wider range of semiconductor materials and manufacturing processes including, for example, CMOS, GaAs, SiGe, etc. The multiple current source prioritization circuits with overvoltage protection as described herein may be represented (without limitation) in software (object code or machine code in non-transitory computer-readable media), in varying stages of compilation, as one or more netlists (e.g., a SPICE netlist), in a simulation language, in a hardware description language (e.g., Verilog, VHDL), by a set of semiconductor processing masks, and as partially or completely realized semiconductor devices (e.g., an ASIC). Some implementations may be a standalone integrated circuit, while others may be embedded as part of larger system, module, or vehicle.

It will be understood by those skilled in the art that changes in the form and details of the implementations described above may be made without departing from the scope of this disclosure. In addition, although various advantages have been described with reference to some implementations, the scope of this disclosure should not be limited by reference to such advantages. Rather, the scope of this disclosure should be determined with reference to the appended claims.

What is claimed is:

1. A multiple current source prioritization circuit that prevents a battery from charging to a voltage above a first voltage setpoint for a first voltage regulator, comprising:
    a first input configured to interface to an alternator coupled to the first voltage regulator;
    a second input configured to interface to a solar panel, the second input having a current regulator;
    a first output configured to interface to the battery having a charge/discharge current and to a load having a load current;
    a first circuitry configured to detect that the alternator is in a first state, the first state corresponding to the first voltage setpoint for the first voltage regulator; and
    a second circuitry configured to:
        when the first circuitry represents that the alternator is in the first state,
            set the current regulator to a first constant current value below the load current, wherein:
                a first current at the first output includes an amount of current from the solar panel corresponding to at least the first constant current value.

2. The multiple current source prioritization circuit of claim 1, wherein the second input further includes a second voltage regulator, and further wherein the second input includes a switch for selectively coupling the second voltage regulator or the current regulator to the solar panel.

3. The multiple current source prioritization circuit of claim 1, wherein the second input further includes a second voltage regulator, and further wherein each of the second voltage regulator and current regulator can be separately enabled/disabled.

4. The multiple current source prioritization circuit of claim 1, wherein the second input further includes a second voltage regulator, and further wherein a charge controller is configurable to a first mode to operate as the current regulator, and the charge controller is configurable to a second mode to operate as the second voltage regulator.

5. The multiple current source prioritization circuit of claim 4, wherein the second circuitry is further configured to:
    when the first circuitry represents that the alternator is not in the first state:
        configure the charge controller to operate in the second mode using boost/bulk/float battery charging voltage regulation.

6. The multiple current source prioritization circuit of claim 4, wherein the charge controller is configured to the first mode to operate as the current regulator by overriding a control loop for the second voltage regulator.

7. The multiple current source prioritization circuit of claim 6, wherein overriding the control loop for the second voltage regulator includes providing an indication of a voltage setpoint for the second voltage regulator that overrides proportional-integral-derivative (PID) functions of the second voltage regulator.

8. The multiple current source prioritization circuit of claim 1, wherein the first state corresponds to an amount of current from the alternator that is greater than about 0.5 Amperes, or a voltage presence between about 10 V to about 60 V for longer than about five seconds.

9. The multiple current source prioritization circuit of claim 1, further comprising:
third circuitry configured to monitor an increased current generated by the alternator, the increased current generated by the alternator corresponding to an increased load current;
wherein the second circuitry is further configured to:
set the current regulator to a second constant current value below the increased load current, wherein:
a second current at the first output includes an amount of current from the solar panel corresponding to at least the second constant current value.

10. A method of operating a multiple current source prioritization circuit that prevents battery overcharging, the method comprising:
detecting, by a first circuitry, the output of an alternator interfaced through a first input;
providing, by the first circuitry, the detected output of the alternator to a second circuitry;
determining, by the second circuitry, that the alternator is in a first state, the first state corresponding to a first voltage setpoint for a first voltage regulator for the alternator;
configuring, by the second circuitry, in response to determining that the alternator is in the first state, a current regulator to a first constant current value below a load current, wherein:
the load current is interfaced through a first output, the first output being interfaced to a battery having a charge/discharge current and to a load having the load current, and wherein the current regulator is interfaced through a second input to a solar panel; and further wherein:
a first current at the first output includes an amount of current from the solar panel corresponding to at least the first constant current value.

11. The method of claim 10, wherein the second circuitry further includes a second voltage regulator, and further wherein a charge controller is configurable to a first mode to operate as the current regulator, and the charge controller is configurable to a second mode to operate as the second voltage regulator.

12. The method of claim 11, wherein the second circuitry is further configured to:
when the first circuitry represents that the alternator is not in the first state:
configure the charge controller to operate in the second mode using boost/bulk/float battery charging voltage regulation.

13. The method of claim 12, wherein the charge controller is configured to the first mode to operate as the current regulator by overriding a control loop for the second voltage regulator.

14. The method of claim 13, wherein overriding the control loop for the second voltage regulator includes providing an indication of a voltage setpoint for the second voltage regulator that overrides proportional-integral-derivative (PID) functions of the second voltage regulator.

15. The method of claim 10, wherein the first state corresponds to an amount of current from the alternator that is greater than about 0.5 Amperes, or a voltage presence between about 10 V to about 60 V for longer than about five seconds.

16. The method of claim 10, further comprising:
monitoring, using third circuitry, an increased current generated by the alternator, the increased current generated by the alternator corresponding to an increased load current;
set, by the second circuitry, in response to the third circuitry indicating an increased load current, the current regulator to a second constant current value below the increased load current, wherein:
a second current at the first output includes an amount of current from the solar panel corresponding to at least the second constant current value.

17. A circuit, comprising:
a first input configured to interface to a first power source;
a second input configured to interface to a second power source;
a first output configured to interface to a battery having a charge/discharge current and to a load having a load current;
a first circuitry configured to detect that the first power source is in a first state, the first state corresponding to the first power source being regulated by a first voltage setpoint for a first voltage regulator coupled to the first power source, the first voltage setpoint being below overvoltage conditions for the battery; and
a second circuitry configured to:
when the first circuitry represents that the first power source is in the first state;
generate a first constant current value below the load current, wherein:
a first current at the first output includes an amount of current from the second power source corresponding to at least the first constant current value.

18. The circuit of claim 17, wherein the second circuitry is further configured to:
when the first circuitry represents that the first power source is not in the first state:
generate voltages using boost/bulk/float battery charging voltage regulation.

19. The circuit of claim 17, wherein the second circuitry further includes a charge controller selectively configurable to:
a first mode to generate current at the first constant current value, and to a second mode to generate voltages at the boost/bulk/float voltages.

20. The circuit of claim 19, wherein the charge controller is configured to the first mode to operate as a current regulator by overriding a control loop for voltage regulation.

* * * * *